Oct. 15, 1963   R. O. GORDON   3,106,938
HYDRAULIC VALVE
Filed Feb. 14, 1962   9 Sheets-Sheet 3

INVENTOR
RICHARD O. GORDON
BY
Kenneth C. Witt
ATTORNEY

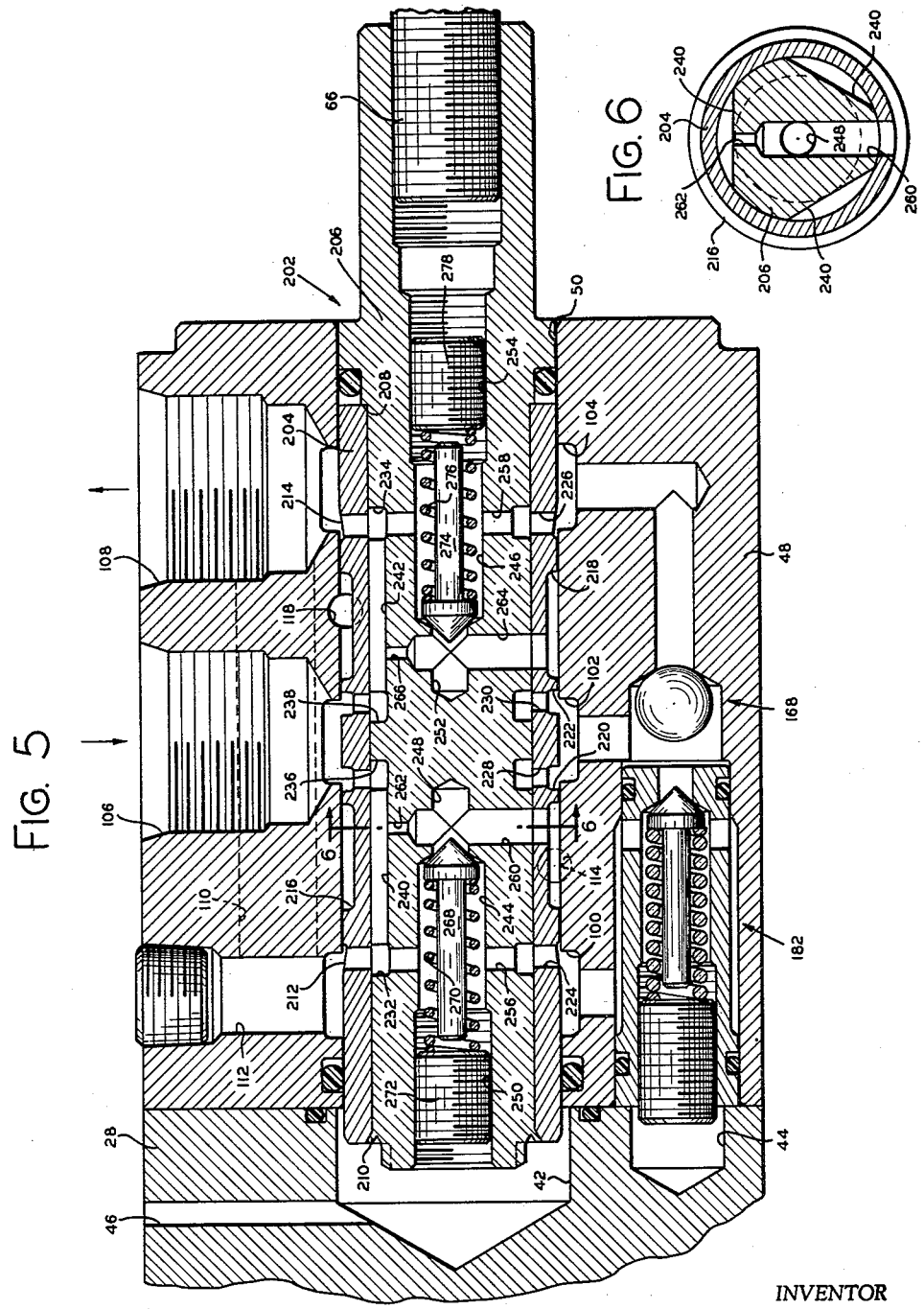

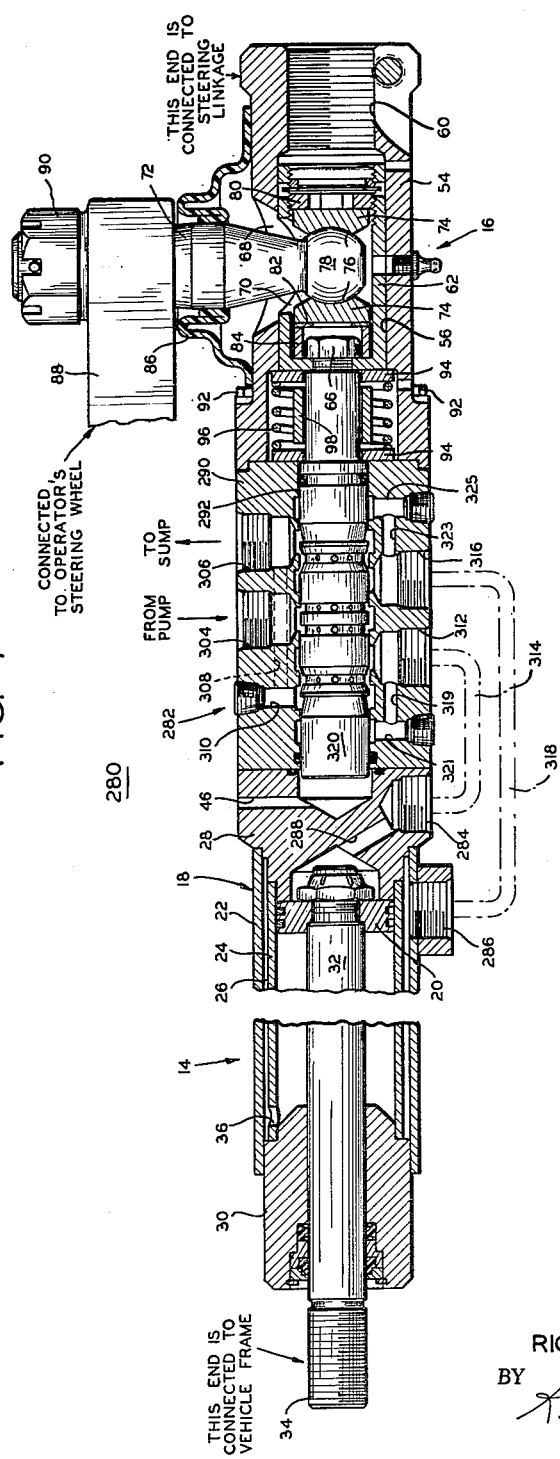

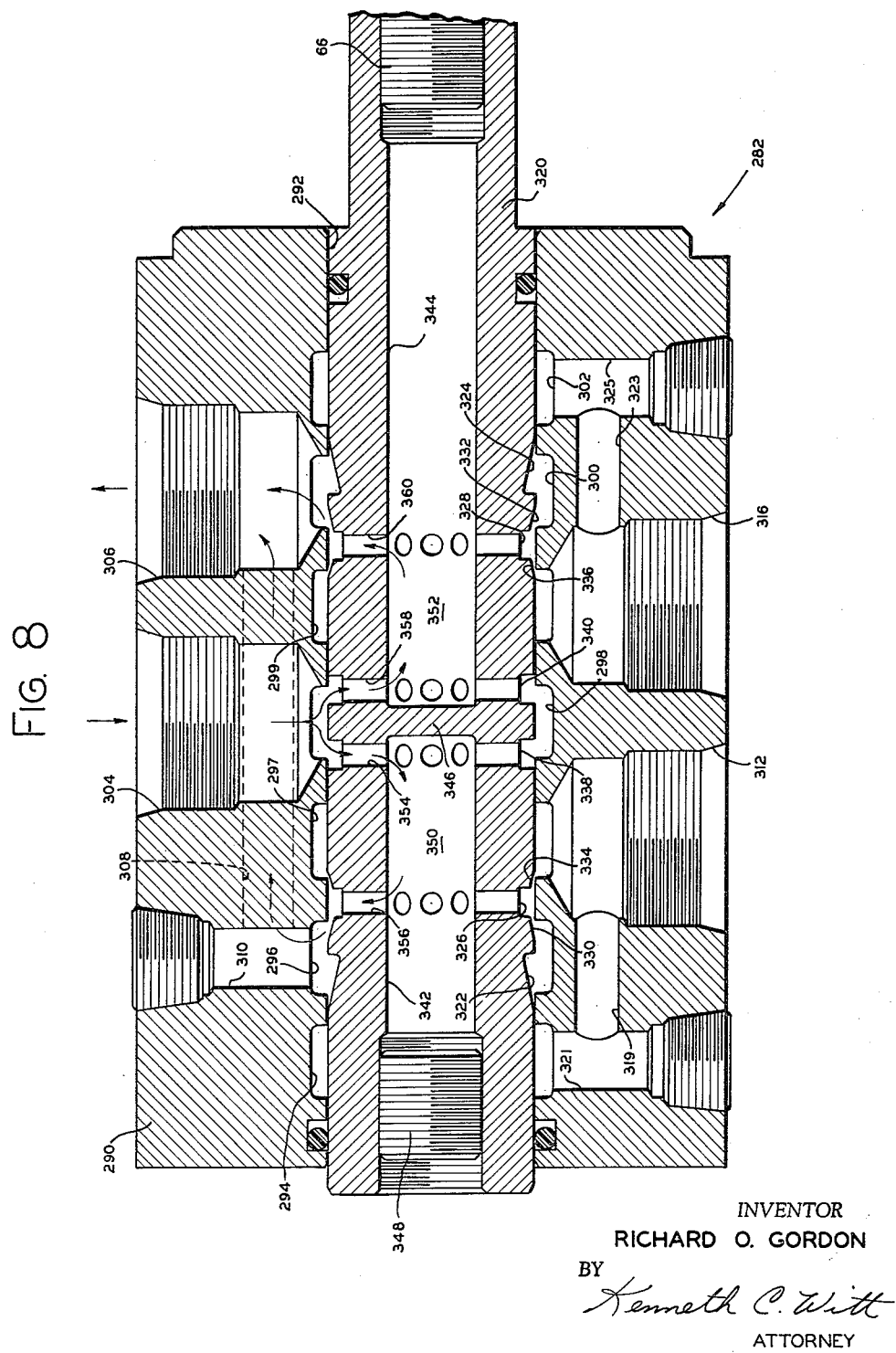

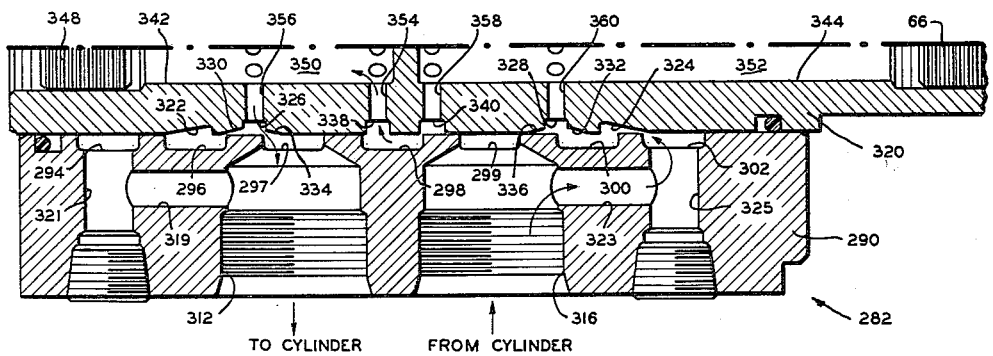
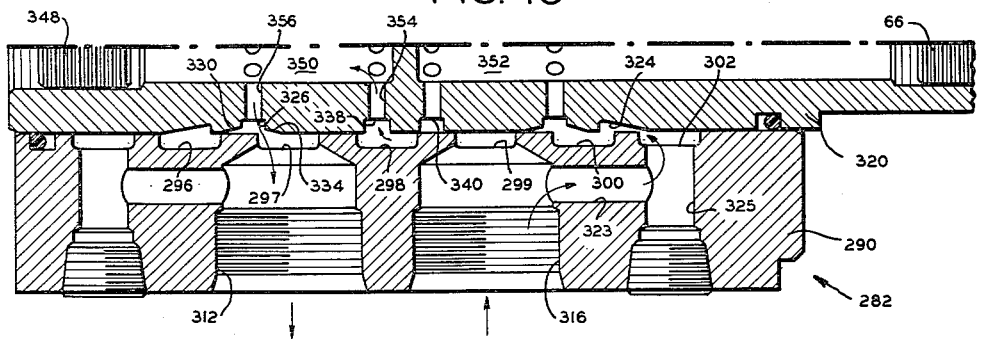
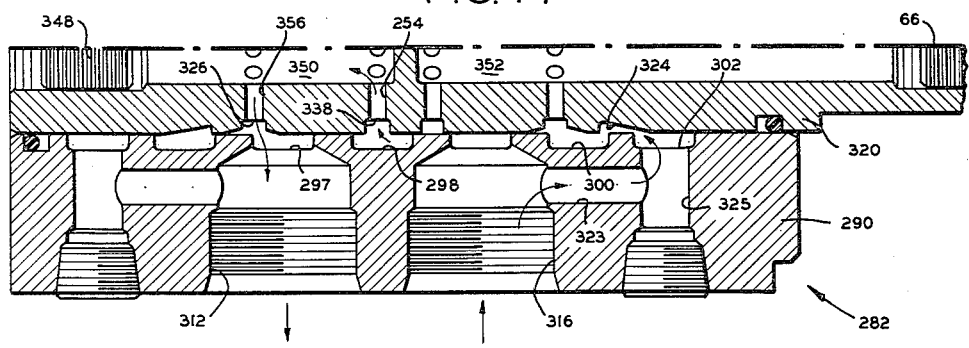

Oct. 15, 1963   R. O. GORDON   3,106,938
HYDRAULIC VALVE
Filed Feb. 14, 1962   9 Sheets-Sheet 8

INVENTOR
RICHARD O. GORDON
BY
*Kenneth C. Witt*
ATTORNEY

Oct. 15, 1963 R. O. GORDON 3,106,938
HYDRAULIC VALVE
Filed Feb. 14, 1962 9 Sheets-Sheet 9
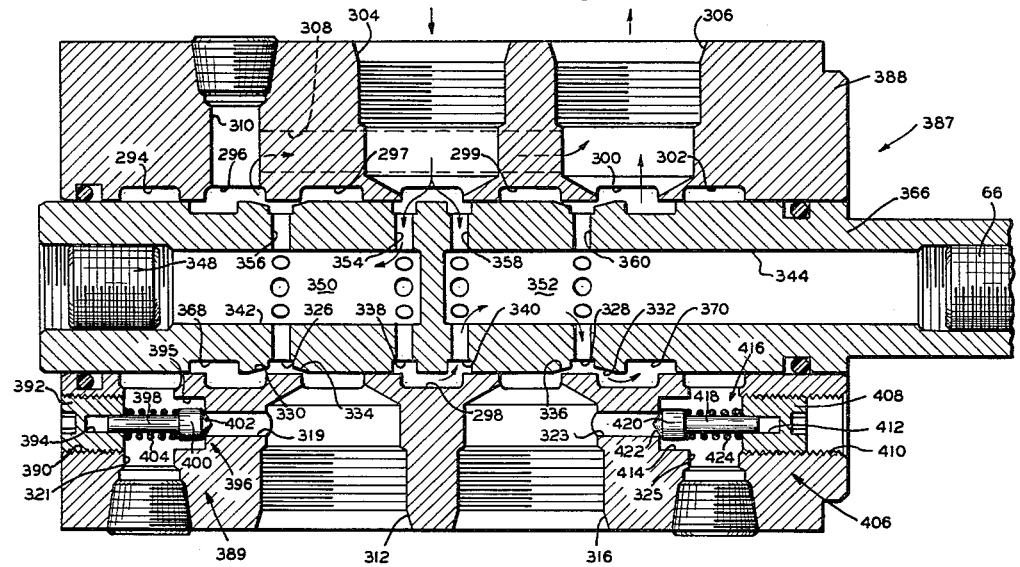
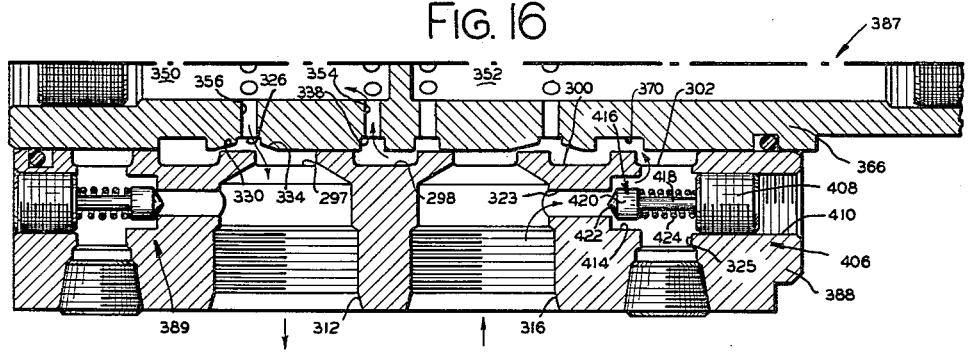
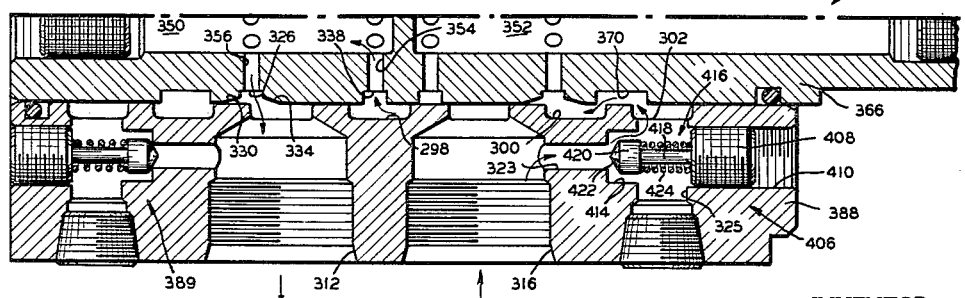
INVENTOR
RICHARD O. GORDON
BY
Kenneth C. Witt
ATTORNEY ған
United States Patent Office 3,106,938
Patented Oct. 15, 1963

3,106,938
HYDRAULIC VALVE
Richard O. Gordon, New Buffalo, Mich., assignor to Clark Equipment Company, a corporation of Michigan
Filed Feb. 14, 1962, Ser. No. 174,076
28 Claims. (Cl. 137—625.68)

This invention relates to hydraulic valves, and more particularly to a so-called open center four-way valve of the type which may be utilized as a control valve in power steering systems.

As used herein an open center valve means a valve which is so arranged that when the valve is in the neutral position hydraulic fluid flows continuously through the valve from the inlet port to the outlet port without significant restriction. When the valve is moved from the neutral position to an operating position pressure immediately builds up because the fluid is redirected to a servomotor or similar device and can no longer flow directly to the outlet port, the pressure being dependent upon the resistance that must be overcome to operate the servomotor; and this enables the energy of the pressurized hydraulic fluid to be utilized for operating a servomotor or other device. "Four-way" valve as used herein has reference to the fact that the valve has four ports. One of these is an inlet port and another is the outlet port, while the other two ports are connected to the servomotor or other device to be operated by the valve.

While the invention is described and illustrated herein in certain embodiments which are adapted for use in vehicle power steering systems it will be appreciated that the valve of this invention has other uses. It has been used in vehicle power steering systems and it has also been used as a levelling valve for vehicles equipped with liquid springs.

In a vehicle having dirigible wheels and equipped with a servo type power steering system there is generally a double-acting piston and cylinder type fluid actuator connected at one end to a fixed part of the vehicle frame and connected at the other end to the steering linkage so that extension and retraction of the piston rod causes the dirigible wheels to pivot in one or the other direction, thus steering the vehicle. The flow of fluid to and from the cylinder is controlled by a power steering control valve which may be a four-way open center valve. The servo type power steering system also has follow-up means whereby the position of the dirigible wheels of the vehicle is directly responsive to the position of the operator's steering wheel or, in other words, the position of the dirigible wheels changes only so long as the operator's steering wheel is being turned. To provide such a follow-up arrangement the valve body of the power steering control valve conveniently may be connected to the steering linkage, while the valve spool of the power steering control valve is connected to the operator's steering wheel through an intermediate linkage which ordinarily includes a drag link and pitman arm linkage which is connected through a worm gear to the operator's steering wheel. If desired, the piston and cylinder type fluid actuator and the power steering control valve conveniently may be a unitary assembly.

Also, while there is referred to herein a vehicle having dirigible wheels which may be turned with respect to the frame or body portion of the vehicle in order to accomplish steering it will be appreciated that the power steering systems embodying the valve of this invention likewise may be utilized with an articulated vehicle. Such a vehicle has two separate frame portions, a tractor portion and a trailer portion, with the two frame portions interconnected by a combined draft and steering coupling and it is steered by pivoting one frame portion of the vehicle with respect to the other frame portion.

The servo type power steering system functions satisfactorily in the large majority of installations; however, a small percentage of vehicles equipped with such a power steering system do not react smoothly. On these vehicles, the force required to break the dirigible wheels loose and begin steering while the vehicle is standing still, or moving very slowly, is substantially greater than the force required to keep the dirigible wheels moving in steering operation once they are in motion. In such vehicles it appears that when the operator's steering wheel is moved to initiate valve spool travel relative to the valve body, the power steering pump pressure applied to the power steering cylinder begins to build up to a peak pressure without any substantial movement of the power steering actuator, steering linkage or dirigible wheels. Energy also is being stored in the flexing of the tires relative to the surface they are on; in the mechanical "windup" of the steering linkages, ball joints, king pin bearings; deflection in the linkages; hose expansion; etc. When the wheels finally begin steering movement, the entire steering system accelerates very rapidly whereby the system quickly acquires a relatively high velocity. The valve body consequently moves past or overshoots the neutral position to an open position in the opposite direction, directing pressure fluid to the other end of the cylinder. The same energy buildup occurs in the opposite direction. When the energy buildup is sufficient the dirigible wheels again break loose and the system accelerates as before, acquiring a relatively high velocity in the opposite direction. The control valve body again overshoots the neutral position. Such action may be self-sustaining, causing the dirigible wheels and linkage to be subject to violent forces and motions. This action or oscillation is ordinarily described as chatter or shimmy. It may sometimes be induced with a snap of the steering control wheel when the vehicle is standing still or while rolling slowly.

This overshooting of the control valve body past the neutral position and resultant oscillation is a very costly and serious problem with the manufacturers of power steering systems and devices. There are a number of arrangements used by such manufacturers to try to correct power steering systems, i.e., control chatter or oscillation; however, none of these arrangements is 100% effective. Most of them make use of fixed orifices, bevelled cuts on the edges of the spool, tapered notches, dash pots in the valves, hydraulic reaction areas in the steering control valves, or a combination of these. Generally, these arrangements require a compromise in order to stabilize a vehicle having power steering which is subject to chatter. For example, stabilizing the power steering system may result in an undesirably high force being required to turn the operator's steering wheel or an undesirably high back pressure in the neutral position of an open center control valve with the result that the fluid in the system tends to heat up which may shorten the life of the steering pump.

It is a principal object of my invention to provide a valve which may be used to stabilize a power steering system without changing the effort required to turn the operator's steering wheel and without producing an unduly high back pressure in the neutral position.

An important object of my invention is to provide a valve that can be quickly adjusted to stabilize any vehicle power steering mechanism with any fluid actuator cylinder size.

Another object of my invention is to provide a valve that prevents overshooting and oscillation in a servo system.

A further object of my invention is to provide a valve that prevents fluid flow from one side of the piston in a fluid actuator to the other side of the piston when the valve is in the neutral position.

Still another object of my invention is to provide a valve which stabilizes a power steering system without affecting the steering speed of the system.

A further object of my invention is to provide a steering control valve which may be employed to stabilize any power steering system independently of the steering control wheel effort, neutral position back pressure or steering speed.

In carrying out my invention in one form thereof I provide an elongated valve body having a longitudinally extending bore. Communicating with the bore is a fluid inlet port, a fluid outlet port and a pair of longitudinally spaced apart fluid actuator ports. A spool, slidably disposed in the bore, has first and second passage means therein. Disposed respectively in said passage means is a pair of restrictions, each restriction being formed by the cooperation of an adjustment screw with a portion of the respective passage means. The passage means and restrictions cooperate with the various ports to provide a substantially unrestricted fluid flow between the fluid inlet and outlet ports and restricted fluid communication with the fluid actuator ports in a first spool position, a substantially unrestricted fluid flow to one of the fluid actuator ports and restricted fluid flow from the other of the fluid actuator ports in a second spool position, and a substantially unrestricted fluid flow to the other fluid actuator port and restricted fluid flow from the one fluid actuator port in a third spool position.

A second embodiment of my invention is similar to the above-described first embodiment, except that the restrictions include a pair of one-way poppet valves disposed in the respective passage means to provide a by-pass for the restrictions at predetermined back pressure.

In carrying out my invention is a third embodiment I provide an elongated valve body having a longitudinally extending bore. Communicating with the bore is a fluid inlet port, a fluid outlet port, a pair of longitudinally spaced apart fluid actuator ports and a first pair of longitudinally spaced apart passage means additionally connecting the respective fluid actuator ports with the bore. A spool, slidably disposed in the bore, has a second pair of passage means therein for connecting the inlet port with the outlet port and the fluid actuator ports. Located in the periphery of the spool is a pair of annular tapered grooves which cooperate respectively with the first pair of passage means to provide a pair of variable restrictions to fluid flow from the respective fluid actuator ports. The passage means, ports and annular grooves all cooperate to provide a substantially unrestricted fluid flow between the fluid inlet and outlet ports and restricted fluid communication with the fluid actuator ports in a first spool position, a substantially unrestricted fluid flow to one of the fluid actuator ports and a restricted fluid flow from the other of the fluid actuator ports in a second spool position, and a substantially unrestricted fluid flow to the other fluid actuator port and a restricted fluid flow from the one fluid actuator port in a third spool position.

A fourth embodiment of my invention is similar to the above-described third embodiment, except that the fluid flow restrictions include a pair of screws which cooperate respectively with the first pair of passage means to provide a fixed orifice in each one of the first passage means.

A fifth embodiment of my invention is similar to the above-described third embodiment, except that the fluid flow restrictions include a pair of one-way poppet valves disposed respectively in the first passage means to provide a constant pressure, variable volume fluid flow from each fluid actuator port.

The above objects and other objects, features and advantages of my invention will become more readily apparent to a person skilled in the art from the following detailed description when taken in conjunction with the attached drawing in which:

FIGURE 5 is similar to FIG. 2, except that a second embodiment of the valve spool is shown;

FIGURE 6 is a cross-section taken along line 6—6 in FIG. 5;

FIGURE 7 is a longitudinal sectional view of a power steering assembly embodying a third embodiment of my invention;

FIGURE 8 is an enlarged fragmentary view of the control valve of FIG. 7 showing the valve spool in section;

FIGURES 9, 10 and 11 are similar to FIG. 8, except that only the portion of the control valve below the center line is shown and the valve spool has been shifted from the neutral position to a partially open position, a further open position and a fully open position, respectively;

FIGURE 15 is similar to FIG. 8, except that a fifth embodiment of the control valve is shown; and FIGURES 16 and 17 are similar to FIG. 15, except that only the portion of the control valve below the center line is shown and the valve spool has been shifted from the neutral position to a partially open position and a fully open position, respectively.

Figure 1:
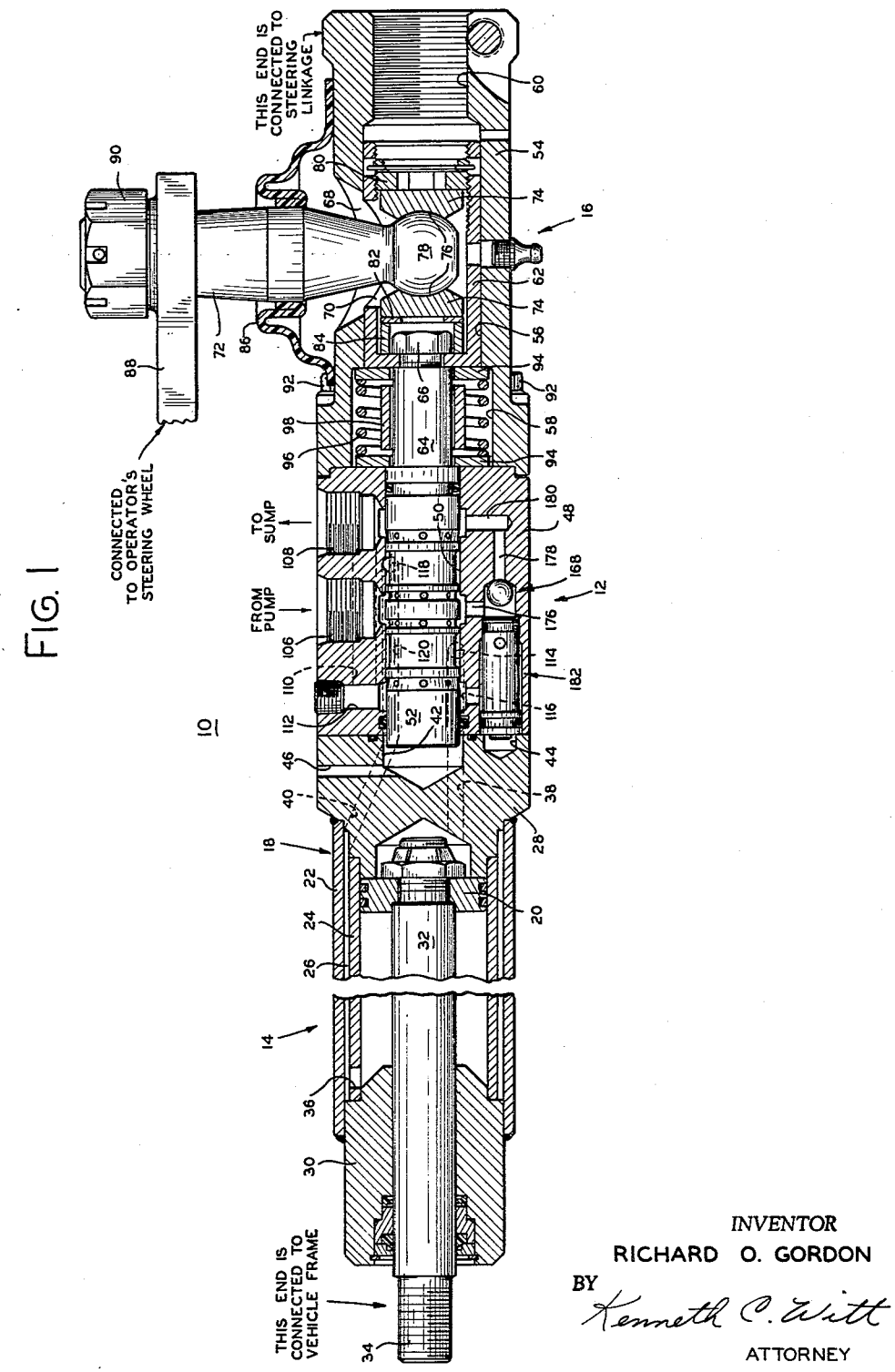
FIGURE 1 is a longitudinal sectional view of a power steering assembly embodying my invention.

Referring now to FIG. 1, the numeral 10 denotes generally a power steering mechanism including a control valve 12 to which is secured at opposite ends thereof respectively a double-acting piston and cylinder type fluid actuator or motor 14 and a ball stud control assembly 16.

Fluid actuator 14 includes a cylinder 18 and a piston 20 slidably disposed within cylinder 18 for reciprocal movement therein. The cylinder 18 is of double wall construction and has an outer sleeve 22 and an inner sleeve 24, the sleeves cooperating to define an annular longitudinally extending fluid passage 26 therebetween. Outer sleeve 22 is secured to a cylinder head end portion 28, preferably by welding. Secured to the other end of outer sleeve 22 is a piston rod end portion 30. A piston rod 32 is connected to piston 20 and extends outwardly through piston rod end portion 30 and has a threaded end 34 which is adapted to be pivotally connected to a vehicle frame. Annular fluid passage 26 is connected to the interior of cylinder 18 at the piston rod end thereof with a fluid passage 40 in cylinder head end portion 28, passage 40 being registrable with another fluid passage as will be explained hereinafter. Cylinder head end portion 28 also has disposed therein a fluid passage 38 which opens into the interior of cylinder 18 at the head end thereof and is registrable at the other end thereof with another fluid passage, also to be explained in more detail shortly hereinafter. In addition, cylinder head end portion 28 has disposed in the right end surface thereof a pair of bores 42 and 44. Bore 42 is connected with the atmosphere by means of a passage 46 which, as will be seen, serves to bleed off any liquid leaking into bore 42 which otherwise would become trapped there and prevent proper operation of steering control valve 12.

The control valve 12 has a body or housing portion 48 which is secured to the right end of cylinder head portion 28. A bore 50 extends longitudinally through valve body 48 and has slidably disposed therein a valve spool 52.

Secured to the end of valve body 48 opposite cylinder head end portion 28 in a manner to be explained is ball stud control assembly 16. Control assembly 16 includes a housing 54 which has a longitudinally extending bore 56 and counterbore 58 and an internally threaded portion 60 adjacent the end opposite valve body 48. Threaded portion 60 forms part of a pivotal connection between power steering assembly 10 and the steering linkage (not shown). A cup-shaped sleeve member 62 is slidably disposed in bore 56 and connected to a necked down portion 64 of valve spool 52 by means of a machine screw 66, as shown. Aligned openings 68 and 70 are provided in housing 54 and sleeve 62, respectively, for a ball stud 72. The ball stud 72 is held in a socket formed by a pair of blocks 74 disposed in sleeve 62, each having a hemispherical surface 76 which cooperates with the ball portion 78 of stud 72, thus providing a connection capable of limited pivotal movement in any direction. Blocks 74 are held in abutment with ball portion 78 by member 80 which threadably engages sleeve 62. In order to prevent the ball stud connection from rattling a spring washer 82 is inserted between an annular spacer 84 and one of blocks 74. A resilient cover 86 fits around stud 72 and against housing 74 to prevent dirt and other foreign matter from entering the ball stud connection. A drag link 88 may be connected to control ball stud 72 and may be held in place by means of a castellated nut 90. Drag link 88 ordinarily is connected to a pitman arm (not shown) which in turn is connected through a suitable gear mechanism to the operator's steering wheel so that rotational movement of the steering wheel results in axial movement of valve spool 52.

The control assembly 16, control valve 12 and fluid actuator 14 are secured together to form power steering assembly 10 by means of a plurality of long shanked machine screws 92 which extend through housing 54 of control assembly 16 and valve body 48 and threadably engage cylinder head end portion 28. Machine screws 92 are tightened down so that the abutting ends of cylinder head end portion 28, valve body 48 and housing 54 are held in fluid sealing relation.

Disposed in counterbore 58 is a pair of washers 94 through which necked down portion 64 of valve spool 52 passes and which are held in abutment with sleeve 62 and the shoulder formed by the necked down portion 64, respectively, by a helical spring 96 disposed between the washers. The washers 94 and helical spring 96 cooperate with sleeve 62 and shoulder of valve spool 52 to maintain valve spool 52 in a centered or neutral position or return it thereto, as shown in FIG. 1.

Disposed between washers 94 and within helical spring 96 is an annular spacer member 98 which serves to limit the stroke of valve spool 52 in either direction by the amount of clearance between spacer 98 and washers 94.

Referring now also to FIGS. 2 through 5, valve body 48, as pointed out hereinabove, includes a longitudinally extending bore 50. Disposed in bore 50 are three longitudinally spaced apart annular grooves 100, 102 and 104. An inlet port 106 in the valve body communicates directly with groove 102 and can be connected to a source of pressurized fluid. An outlet port 108 in the valve body communicates directly with groove 104, and also is in communication with groove 100 by means of connecting passages 110 and 112. Outlet port 108 can, of course, be connected to a sump or reservoir, not shown, by any suitable fluid passage means. A fluid motor or actuator port 114 is disposed between grooves 100 and 102 and opens into bore 50 at one end thereof. The other end of port 114 connects with a longitudinally extending passage 116 (see FIG. 1) which registers with passage 38 so that fluid motor port 114 is in communication with the head end of the interior of cylinder 18. Another fluid motor or actuator port 118 is disposed in valve body 48 between grooves 102 and 104. Fluid motor port 118 communicates at one end thereof with bore 50 and is connected at the other end thereof with a longitudinally extending fluid passage 120 (see FIG. 1) which registers with fluid passage 40 with the result that fluid motor port 118 communicates with the piston rod end of the interior of cylinder 18. Passages 38, 40, 116 and 120 and fluid motor port 114 are shown in dotted outline to indicate that they actually lie out of the plane on which the section is taken in FIGS. 1 through 5.

Figure 2:
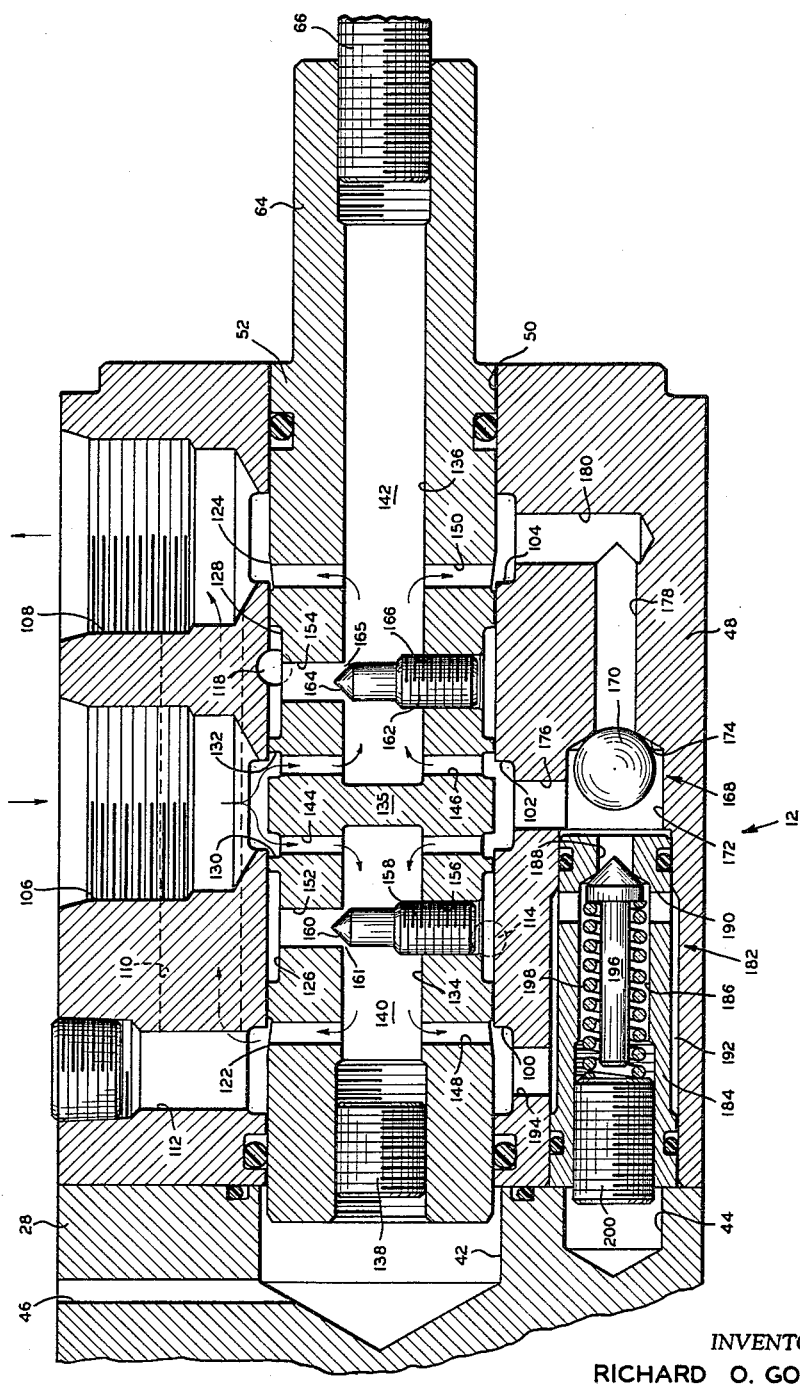
FIGURE 2 is an enlarged fragmentary view of the control valve of FIG. 1 showing the valve spool in section.

Referring now principally to FIG. 2, valve spool 52 is shown disposed in the neutral or centered position. Valve spool 52 has a pair of tapered annular grooves 122 and 124 in the outer surface thereof which communicate, respectively, in the neutral position of the spool, with grooves 100 and 104 in the housing. Located inwardly of grooves 122 and 124 in the outer surface of spool 52 is another pair of annular grooves 126 and 128 which communicate respectively with fluid motor ports 114 and 118. Inwardly of grooves 126 and 128 and in the outer surface of spool 52 is another pair of annular grooves 130 and 132, both of which communicate with groove 102 in the neutral position of valve spool 52. Disposed in spool 52 is a first coaxially extending bore 134 and a second coaxially extending bore 136, said bores being separated from each other by an intervening barrier portion 135. The open end of bore 134 is closed by a plug 138 to form a chamber 140. Likewise, the open end of bore 136 is closed by machine screw 66 to form a chamber 142 which is separate from chamber 140.

Half of the grooves in the outer surface of spool 52 are connected by means of passages with chamber 140 and the other half of the grooves in the outer surface of spool 52 are connected by means of passages with chamber 142. More specifically, a plurality of radially extending passages 144 connect groove 130 with chamber 140. Similarly, a plurality of radially extending passages 146 connect groove 132 with chamber 142. Tapered grooves 122 and 124 are connected respectively with chambers 140 and 142 by a plurality of radially extending passages 148 and 150. Groove 126 is connected with chamber 140 by means of a single radially extending passage 152. Similarly, groove 128 is connected to chamber 142 by means of a radially extending passage 154.

Disposed in spool 52 diametrically opposite passage 152 is a radially extending threaded hole 156 which receives an adjustment screw 158 having a cone point 160. An adjustment screw 162 having a cone point 164 is similarly disposed diametrically opposite passage 154 in a threaded hole 166. It will be obvious that cone points 160 and 164 cooperate respectively with passages 152 and 154 to form therewith fixed orifices or restrictions 161 and 165 which may be adjusted by threading screws 158 and 166 into or out of holes 156 and 162, respectively.

When the valve spool 52 is in the position shown in FIGS. 1 and 2 steering control valve 12 is in a neutral condition. In neutral, the fluid flow is in through inlet port 106 to groove 102 where it divides substantially evenly, one-half flowing through passages 144 into chamber 140 and the other half flowing through passages 146 into chamber 142. The fluid in chambers 140 and 142 flows respectively out through passages 148 and 150 and thence to outlet port 108 from which it flows to the reservoir. While there is normally no flow, in the neutral position, to or from the interior of cylinder 18 through ports 114 and 118, fluid pressure is maintained on both sides of piston 20 by communication through orifices 161 and 165. Thus it will be seen that in the neutral position of valve 12 there is substantially unrestricted flow of fluid therethrough since there is no fluid flow through either orifice 161 or orifice 165. Nevertheless, fluid pressure is maintained on each side of piston 20 since the pressure fluid in chambers 140 and 142 is in communication with opposite ends of the interior of cylinder 18 through orifices 161 and 165, respectively. Also, because orifices 161 and 165 restrict fluid flow into and out of cylinder 18 in the neutral position of valve 12 this valve facilitates steering over any kind of obstruction the dirigible wheels will normally encounter since the fluid actuator 14 tends to return to its original position.

Figure 3:
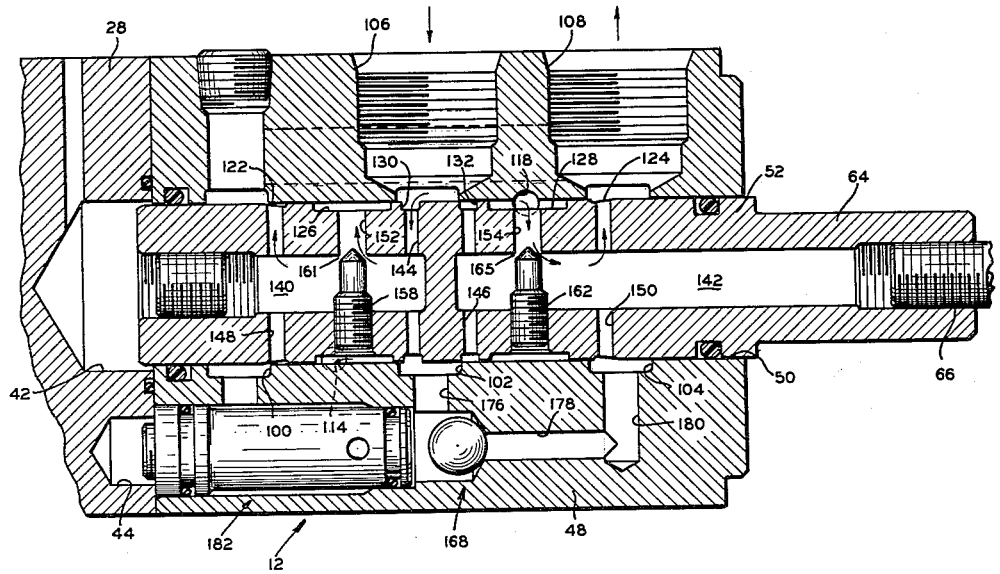
FIGURES 3 and 4 are similar to FIG. 2, except that the valve spool has been shifted from the neutral position to a partially open position and a fully open position, respectively.

Referring now principally to FIG. 3 wherein valve spool 52 is shown displaced slightly to the right so that groove 132 is no longer in communication with groove 102, the fluid flow to and from cylinder 18 is such that actuator 14 extends with the result that the steering angle of the dirigible wheels is changed in one direction. In this condition of control valve 12 fluid flow is from a pump to inlet port 106 which connects with groove 102 and hence to chamber 140 via passages 144. From chamber 140 the flow is through orifice 161 and thence to the head end of the interior of cylinder 18 via passage 152, groove 126, fluid motor port 114 and passages 116 and 38. At the same time, fluid is being forced out of the piston rod end of cylinder 18 and out through fluid motor port 118 into groove 128 and hence through passage 154 past orifice 165 into chamber 142 and out of chamber 142 by way of fluid passages 150 into outlet port 108. When valve spool 52 is in the position shown in FIG. 3 piston 20 is subjected on the right side to substantially full pump pressure, an insignificant amount of fluid passing out of chamber 140 via passages 148 which are not quite out of communication with groove 100. The other side of piston 20 is subject to the fluid back pressure caused by the fluid flowing out of cylinder 18 having to flow through orifice 165.

Figure 4:
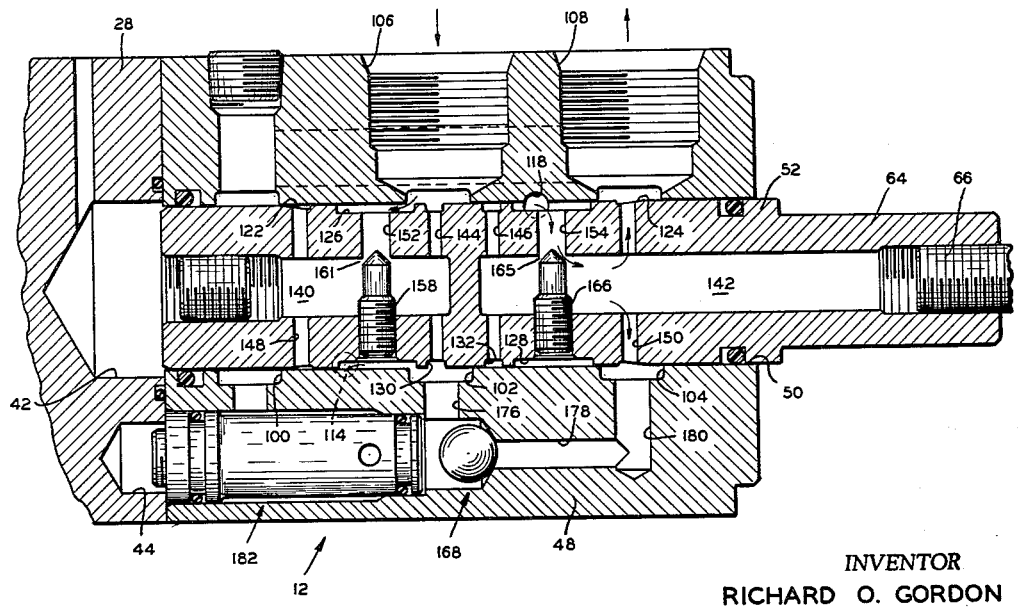

When valve spool 52 is shifted to the extreme limit of its rightward movement, as shown in FIG. 4, the fluid flow is the same as in FIG. 3, except that the fluid flow from inlet port 106 to fluid motor port 114 by-passes orifice 161 so that there is a substantially unrestricted fluid flow into cylinder 18.

A safety check valve 168 is provided in valve body 48. This valve includes a ball 170 (see FIG. 2) disposed in a bore 172 which normally is held in fluid sealing relation against seat 174 by fluid pressure communicated to bore 172 by a passage 176 which connects groove 102 with bore 172. Bore 172 also is connected to groove 104 by means of connecting passages 178 and 180. In the event of fluid pressure failure it is still possible to steer the the vehicle manually by moving valve body 48 in one direction or the other depending upon which direction it is desired to change the steering angle of the dirigible wheels. That is, the valve spool 52 is moved the full extent of its movement relative to valve body 48 in either direction, and thereafter carries valve body 48 and the rest of the power steering assembly connected to the steering linkage with it due to the cooperation of washers 94, spacer 98 and the shoulders adjacent washers 94. For all practical purposes, the result is as though the rag link and pitman arm linkage were connected directly to the steering linkage. When the vehicle is being thus steered, fluid is being displaced from one side of piston 20 in cylinder 18. Assuming that valve spool 52 is moving to the right and carrying valve body 48 with it, fluid is being displaced from the piston rod end of cylinder 18 from which it flows via fluid motor port 118 into chamber 142. Due to the increasing volume in cylinder 18 on the head end side of piston 20 ball 170 is unseated and the fluid in chamber 142 is pulled through passages 150 into connecting passages 178 and 180 into bore 172. From bore 172 the fluid is pulled through passage 176 into grooves 102 and 126 and fluid motor port and hence into cylinder 18. The result of this essentially is that fluid in the cylinder on one side of the piston is transferred to the cylinder on the other side of the piston. If such a fluid transfer were not provided for by safety check valve 168, then a vacuum would be created in cylinder 18 on one side of piston 20, and thus prevent full manual steering of the vehicle.

Also provided in valve body 48 is a pressure relief valve 182 which serves to prevent excessive pump pressure in the system. This valve is shown in section FIG. 2 and includes a valve body 184 having a longitudinally extending bore 186 with a reduced portion 188 at the end adjacent bore 172. A plurality of radially extending passages 190 connect bore 186 with an annular passage 192 between valve body 184 and the bore in which it is disposed. Passage 192 is connected to groove 100 by means of a passage 194. Disposed in bore 186 is a valve member 196 which normally is held in fluid sealing relation with reduced diameter portion 188 by means of a helical spring 198 which is held in compression by plug 200 which threadably engages valve body 184. By varying the compression of helical spring 198 the pressure required to move valve member 196 away from sealing relation with reduced diameter portion 188 can be varied. In case the fluid pressure in bore 172 exceeds the pressure required to move valve member 196 away from sealing relation with reduced diameter portion 188 pressure fluid is allowed to flow through relief valve 182 from bore 172 to groove 100 and hence to the reservoir which is connected to outlet port 108. In the event that there is a pressure relief valve located elsewhere in the system, then pressure relief valve 182 can be replaced by a solid plug.

It will be understood that fluid seals, such as O-rings, although not described in detail, have ben used throughout the power steering assembly 10 where necessary to provide means for preventing fluid leakage between various surfaces.

Turning now to the operation of the embodiment of my invention shown in FIGS. 1 through 4, it will be assumed that power steering assembly 10 is associated with a vehicle having dirigible wheels and that movement of ball stud 72 to the right as seen in FIG. 1 causes the steering angle of the dirigible wheels to change so that the vehicle makes a right turn when travelling forwardly. Assuming now that valve spool 52 is initially in the neutral position shown in FIGS. 1 and 2, the vehicle will travel in a straight line and pressure fluid will flow from the pump through stering control valve 12 and return to the sump with substantially unrestricted flow. Further, fluid pressure will be maintained on each side of piston 20 so that should the dirigible wheels hit any normal obstructions the vehicle will not deviate from a straight line.

Now, if ball stud 72 is actuated to the right so that the valve spool 52 is moved from the position shown in FIGS. 1 and 2 to the position shown in FIG. 3, the steering angle of the dirigible wheels will be changed so that the vehicle will execute a right turn. Because movement of valve spool 52 to the right directs pressure fluid to the head end of cylinder 18 the valve body 48 is caused to move to the right so that the relationship of valve spool 52 and valve body 48 is returned to the neutral position shown in FIGS. 1 and 2. This last described action is generally termed follow-up and results in a power steering system which is dependent upon continued movement of the spool for continued change of steering angle of the dirigible wheels. Steering speed is dependent upon the extent of displacement of valve spool 52 relative to valve body 48, the fastest steering speed being obtained when the valve spool 52 is fully displaced, as shown in FIG. 4.

It will now be apparent that during steering the piston 20 is held on one side by a force resulting from the pump pressure acting against piston 20 and is held on the other side by a force resulting from the return flow back pressure acting against the area of piston 20. This return flow back pressure depends on the adjustment of the orifices and is set high enough so that valve body 48 is prevented from moving past the neutral position of FIGS. 1 and 2 in the situation where energy is stored in the power steering system prior to the system breaking loose and steering the dirigible wheels, as explained earlier. The valve body 48 is prevented from overshooting the neutral position when the force being applied on the piston resulting from the return flow back pressure in the cylinder is great enough to decelerate the mass of the dirigible wheels and steering linkage. Since the orifices are adjustable the decelerating force can be controlled in the spool to prevent overshooting in any power steering system.

Because the orifices can be adjusted to prevent the valve body 48 from overshooting its neutral position, then it follows that the power steering system will not be subject to oscillation or chatter which is merely a cyclic overshooting of the neutral position by the valve body. Thus, it will be seen that my invention will function to completely stabilize the power steering system.

From the above description it will be apparent that I have provided means for preventing overshooting of the control valve body, and thus also preventing oscillation or chatter in a power steering system without interfering with steering wheel effort or neutral position back pressure. The operator's steering wheel effort is dependent upon the strength of helical spring 96 only and the neutral position back pressure is not affected by the adjustment of orifices 161 and 165 which are used to prevent control valve body overshoot.

While the embodiment of my invention shown in FIGS. 1 through 4 has proven very successful in preventing overshoot and oscillation or chatter in power steering systems, the adjustment of orifices 161 and 165 to stabilize the power steering system also varies the steering speed by controlling the rate of flow of fluid out of the return side of the cylinder, and so establishing the maximum rate of piston movement. In some situations the adjustment of orifices 161 and 165 to prevent oscillation or chatter may result in a steering speed that is undesirably slow. The second embodiment of my invention, as shown in FIG. 5, provides a constant back pressure, variable flow restriction means with the result that a power steering system may be stabilized utilizing the embodiment shown in FIG. 5 without interfering with the steering speed as well as without interfering with neutral condition back pressure or steering wheel effort.

Referring now to FIG. 5, the valve body shown therein is identical to the valve body 48 shown in FIGS. 1 through 4, and so the same reference numerals are applied thereto. The difference between the steering control valve shown in FIG. 2, for example, and that shown in FIG. 5 is in valve spool. Turning now to a description of the embodiment of my invention shown in FIG. 5 a valve spool 202 is slidably disposed in bore 50 of valve body 48. For purposes of manufacture valve spool 200 is a two-part assembly, a close-fitting sleeve member 204 being disposed around an inner spool member 206 and held between a shoulder 208 and a flared out portion 210.

Sleeve member 204 has a pair of longitudinally spaced apart annular tapered grooves 212 and 214 disposed in the outer surface thereof which communicate respectively with grooves 100 and 104 when valve spool 202 is in the neutral position shown in FIG. 5. Disposed inwardly of grooves 212 and 214, also in the outer surface of sleeve 204 is a pair of annular grooves 216 and 218 which communicate respectively with motor ports 114 and 118. Another pair of annular, longitudinally spaced apart grooves 220 and 222 is disposed in the outer surface of sleeve 204 between grooves 216 and 218. Grooves 220 and 222 both communicate with groove 102 when valve spool 202 is in the neutral position shown in FIG. 5. Communicating respectively with grooves 212 and 214 is a plurality of radially extending passages 224 and 226. Also, a plurality of radially extending passages 228 and 230 communicate respectively with grooves 220 and 222. As will be explained in greater detail hereinafter these passages communicate with various grooves in the outer surface of the main spool member 206.

Disposed in the outer surface of main spool member 206 is a pair of longitudinally spaced apart annular grooves 232 and 234 which are disposed so as to communicate respectively with passages 224 and 226. Also, disposed in the outer surface of main spool member 206 is a pair of annular grooves 236 and 238 which are located inwardly of grooves 232 and 234 and communicate respectively with passages 228 and 230. Grooves 232 and 236 are connected by means of three equilaterally disposed chordal grooves 242.

Disposed respectively in main spool member 206 is a pair of a separate coaxially extending bores 244 and 246. Bore 244 has a reduced diameter portion 248 at one end thereof and a threaded portion 250 adjacent the outer end thereof. Bore 246 likewise has a reduced diameter portion 252 and a threaded portion 254. Bore 244 is in communication with groove 232 by virtue of a plurality of radially extending passages 256 and bore 246 is in communication with groove 234 by virtue of a plurality of radially extending passages 258. Reduced diameter portion 248 is in communication with groove 216 by means of a diametrically disposed passage 260 which has a reduced diameter portion 262 which communicates with one of chordal grooves 240. A similarly disposed passages 264 connects groove 218 with reduced diameter portion 252, passage 264 having a reduced diameter portion 266 which connects with one of choral grooves 242. Disposed in bore 244 is a valve member 268 which is biased into fluid sealing relation with reduced diameter portion 248 by means of a helical spring 270 which is held in compression by a plug 272. A similar valve member 274 is disposed in bore 246 and biased into fluid sealing relation with reduced diameter portion 252 by means of a helical spring 276 which is held in compression by a plug 278 which engages threaded portion 254. At this point it will be seen that the cooperation of valve members 268 and 274 with reduced diameter portions 248 and 252, respectively, serves to permit fluid flow only from reduced diameter portions 248 and 252 toward bores 244 and 246, respectively, and then only when the fluid reaches a predetermined pressure.

Turning now to the operation of the second embodiment of my invention, when valve spool 202 is in the position shown in FIG. 5 fluid flow from inlet port 106 divides substantially evenly, one half of the fluid flowing from groove 102 to groove 100 by way of passages 228, groove 236, chordal grooves 240, groove 232 and passages 212. From groove 100 the fluid flows to the reservoir via connecting passages 112 and 110 and outlet port 108. The other half of the fluid flows from groove 102 to groove 104 by way of passages 230, groove 238, chordal grooves 242, groove 234 and passages 214. From groove 104 fluid flows to the reservoir by way of outlet port 108. Also, fluid flowing through one each of chordal grooves 240 and 242 is in communication with cylinder 18 on each side of piston 20 through reduced diameter portions 262 and 266, respectively. Thus, when valve spool 202 is in the position shown in FIG. 5 which is the neutral position, there is substantially unrestricted flow of fluid from inlet port 106 to outlet port 108, and at the same time pressure is maintained on each side of piston 20 through reduced diameter portions 262 and 266. When valve spool 202 is shifted to a position, for example, which corresponds to the position of valve spool 52 in FIG. 3 in order to initiate steering of the vehicle, fluid flow from inlet port 106 and groove 102 is directed entirely to groove 236 by way of passages 228 since groove 222 is no longer in communication with groove 102. Thus, fluid flow is into the head end of cylinder 18 by way of reduced diameter portion 262 and fluid motor port 114 along with the rest of the connecting passages and grooves. Fluid flow out of cylinder 18 is from fluid motor port 118 into passage 264. As long as the fluid flow in passage 264 is below a predetermined pressure level the entire flow is out through reduced diameter portion 266 which acts as an orifice, and hence through connecting passages and grooves to outlet port 108 from which it is directed to the reservoir. When the fluid pressure in passage 264 reaches a predetermined pressure valve member 274 is moved away from sealing relation with bore 252 so that fluid flow is permitted therepast into bore 246 and hence out through connecting passages to outlet port 108. When valve spool 202 is moved the full extent of its movement to the right to a position corresponding to the position of spool valve 52 in FIG. 4 groove 102 is in direct communication with groove 216, so there is substantially unrestricted fluid flow through fluid motor port 114 into the head end of cylinder 18. At the same time all of the fluid flowing out of cylinder 18 must pass through either reduced diameter portion 266 or past valve member 274 on its way to outlet port 108 and hence to the reservoir.

The valve operates similarly when valve spool 202 is actuated to the left to change the steering angle of the dirigible wheels in the opposite direction.

It will now be appreciated that the embodiment shown in FIG. 5 functions substantially in the same manner as the embodiment shown in FIGS. 1 through 4, except that when the fluid flow reaches a predetermined pressure, valve 268 or 274, depending upon which end of the cylinder fluid is flowing out of, is caused to move away from sealing relation with the adjacent reduced diameter portion so that in addition to the reduced diameter portion 262 or 266 through which fluid is flowing, fluid will also flow outwardly through either bore 244 or 246 and hence to outlet port 108. By virtue of these additional paths through which fluid may flow from cylinder 18 it is possible, by the selection of suitable springs for valve members 268 and 274, to arrange the valve so that valve spool 202 is prevented from overshooting its neutral position without interfering with the steering speed of the vehicle. Thus, it is possible to stabilize the vehicle having power steering when using the modification shown in FIG. 5 without interfering with steering wheel effort, neutral position back pressure or steering speed.

While the two embodiments of my invention shown in FIGS. 1 through 6 are successful in preventing overshoot and oscillation or chatter in power steering systems, if the means for restraining fluid flow from the fluid motor ports is located in the valve body, then a more flexible valve can be made which allows independent control of "open center" (neutral position) fluid flow, "open center" return flow shut off, fluid flow into the fluid motor ports and restraint on fluid flow out of the fluid motor ports. The third embodiment of my invention (FIG. 8), the fourth embodiment of my invention (FIG. 12) and the fifth embodiment of my invention (FIG. 15) all have in common the independent control of open center fluid flow, open center return flow shut off, fluid flow into the fluid motor ports and restraint on fluid flow out of the fluid motor ports. The third, fourth and fifth embodiments of my invention differ from each other in that the third embodiment utilizes variable orifices to restrain fluid flow from the fluid motor ports, the fourth embodiment of my invention utilizes fixed orifices to restrain fluid flow from the fluid motor ports and the fifth embodiment of my invention utilizes poppet valves to restrain fluid flow from the fluid motor ports.

A third embodiment of my invention is shown in FIG. 7, wherein the numeral 280 denotes generally a power steering mechanism including a control valve 282 to which is secured at opposite ends thereof, respectively, a double acting piston and cylinder type fluid actuator motor and a ball stud control assembly.

The ball stud control assembly is identical with the one shown in FIG. 1 and the fluid actuator is identical with the one shown in FIG. 1, except that fluid passages 38 and 40 have been replaced by a pair of cylinder ports 284 and 286, cylinder port 284 being connected to the interior of cylinder 18 at the head end thereof by means of a passage 288, and cylinder port 286 communicating directly with annular fluid passage 26. Consequently, like reference numerals have been applied to like parts, reference being had at this point to the specification hereinabove for a description of these components.

Referring now also to FIG. 8, control valve 282 includes an elongated valve body 290 with a longitudinally extending bore 292. Disposed in bore 292 are seven longitudinally spaced apart annular grooves 294, 296, 297, 298, 299, 300 and 302. An outlet port 304 in valve body 290 communicates directly with groove 298 and can be connected to a source of pressurized fluid. An outlet port 306 in valve body 290 communicates directly with groove 300, and also is in communication with groove 296 by means of connecting passages 308 and 310. Passage 208 is shown in dotted outline to indicate that it actually lies out of the plane in which the section is taken in FIGS. 7 and 8. Outlet port 306 can, of course, be connected to a sump or reservoir, not shown, by any suitable fluid passage means. A fluid motor or actuator port 312 is disposed between grooves 296 and 298 and connects at one end thereof with groove 297. The other end of port 312 is connected to cylinder port 284 by means of a conduit 314, and so is in communication with the interior of cylinder 18 at the head end thereof (FIG. 7). Another fluid motor actuator port 316 is disposed in valve body 290 between grooves 298 and 300. Fluid motor port 316 connects at one end thereof with groove 299 and is connected at the other end thereof to cylinder port 286 by means of a conduit 318 (FIG. 7) which connects with annular passage 26 with the result that fluid motor port 316 communicates with the piston rod end of the interior of cylinder 18. In addition, fluid motor port 312 is connected to annular groove 294 means of a pair of connecting passages 319 and 321, and fluid motor port 316 is connected to annular groove 302 by a pair of connecting passages 323 and 325.

Referring now principally to FIG. 8, a valve spool 320 is shown disposed in the neutral or centered position. Valve spool 320 has a pair of tapered annular grooves 322 and 324 in the outer surface thereof which slope inwardly toward the center the spool, as shown. The function of these grooves will be explained later in conjunction with the shifted position of the spool. Located inwardly of the grooves 322 and 324 in the outer surface of spool 320 is another pair of annular grooves 326 and 328 which communicate respectively with grooves 296 and 300 by means of tapered edges 330 and 332. Grooves 326 and 328 also communicate with the respective fluid motor ports 312 and 316 by means of tapered edges 334 and 336. Inwardly of grooves 326 and 328 and also in the outer surface of spool 320 is another pair of annular grooves 338 and 340, both of which communicate with groove 298 in the neutral position of valve spool 320. Disposed in spool 320 is a first coaxially extending bore 342 and a second coaxially extending bore 344, said bores being separated from each other by intervening barrier portion 346. The open end of bore 342 is closed by a plug 348 to form a chamber 350. Likewise, the open end of bore 344 is closed by machine screw 66 to form a chamber 352 which is separate from chamber 350, screw 66 serving also to connect valve spool 320 to ball stud assembly 16.

Grooves 338 and 326 are connected with chamber 350 by means of a plurality of radially extending passages 354 and 356, respectively. In a similar manner, grooves 350 and 328 are connected with chamber 352 by means of a plurality of radially extending passages 358 and 360, respectively.

When valve spool 320 is in the position shown in FIGS. 7 and 8, steering control valve 282 is in a neutral condition. In neutral, the fluid flow is in through inlet port 304 to groove 298 where it divides substantially evenly, one half flowing through passages 354 into chamber 350 and the other half flowing through passages 358 into chamber 352. The fluid in chambers 350 and 352 flows respectively out through passages 356 and 360 and thence to outlet port 306 from which it flows to the reservoir. While there is normally no flow, in the neutral position, to or from the interior of cylinder 18 through ports 312 and 316, minimal fluid pressure is maintained on both sides of piston 20 by fluid communication past tapered edges 334 and 336 since there is a slight back pressure built up in chambers 350 and 352 because the area of the openings defined by tapered edge 330 with the edge of groove 296 and tapered edge 332 with the edge of groove 300 is slightly less than the area of the passages for fluid flow into chambers 350 and 352. Thus it will be seen that in the neutral position of valve 12 there is substantially unrestricted fluid flow therethrough. Nevertheless, because tapered edges 334 and 336, in conjunction with the edges of fluid motor ports 312 and 316, respectively, restrict fluid flow into and out of cylinder 18 in the neutral position of valve 282, this valve facilitates steering over any kind of obstruction that the dirigible wheels will normally encounter since the fluid actuator 14 tends to return to its original position, and also permits actuator 14 to be returned to its original position following a turn by the restoring force of the dirigible wheels.

Referring now principally to FIG. 9 wherein valve spool 320 is shown displaced slightly to the right so that tapered groove 324 begins to communicate with groove 302, the fluid flow to and from cylinder 18 is such that actuator 14 extends with the result that the steering angle of the dirigible wheels is changed in one direction. In this condition of control valve 282, fluid flow is from a pump to inlet port 304 (FIG. 8) which connects with groove 298 and hence to chamber 350 via passages 354. From chamber 350 the fluid flow is outwardly through passages 356 into groove 326 and then past tapered edge 334 into fluid motor port 312. From fluid motor port 312 the fluid flows through conduit 314 to cylinder port 284 and hence into the head end of the interior of cylinder 18 via passages 288. At the same time, fluid is being forced out of the piston rod end of cylinder 18, through cylinder port 286 and conduit 318 and into fluid motor port 316. From fluid motor port 316 the fluid flow is through connecting passages 323 and 325 into groove 302 and then past tapered groove 324 into groove 300 which connects with outlet port 306 and hence the sump. The fluid flow which I have just described is the principal fluid flow. Also, there is some fluid flow past tapered edge 330 into groove 296 and from there to the sump as well as a slight fluid flow from groove 298 to groove 340 and hence to the sump. These secondary fluid flows aid in preventing shock loads in the valve that otherwise would occur if fluid flow between the various passages and ports was shut off abruptly. When valve spool 320 is in the position shown in FIG. 9, piston 20 is subjected on the right side to substantially full pump pressure, a small amount of fluid passing out of chamber 350 via tapered edge 330 and groove 340, as explained hereinabove. The other side of piston 20 is subjected to the fluid back pressure caused by the fluid flowing out of cylinder 18 having to flow through the opening defined by tapered groove 324 and the adjacent edge of groove 302. It will be noted that the opening defined by tapered groove 324 and the adjacent edge of groove 302 is smaller in area than the opening formed by tapered edge 334 and the edge of groove 297 through which fluid flows into cylinder 18, thus causing a back pressure to be exerted on piston 20.

Further displacement of valve spool 320 to the right, as shown in FIG. 10, results in completely closing off communication between tapered edge 330 and annular groove 296 and groove 298 and groove 340 so that the entire fluid flow from groove 298 is into fluid motor port 312 and hence into the head end of the cylinder 18. The fluid flow from cylinder 18 is the same as described above with regard to FIG. 9, except that the restriction to fluid flow is somewhat less because the opening defined by tapered groove 324 and the adjacent edge of groove 302 is greater in area due to the rightward movement of spool 320. As a result, the fluid flow from cylinder 18 will increase while the back pressure remains substantially constant.

When valve spool 320 is shifted to the extreme limit of its rightward movement, as shown in FIG. 11, the fluid flow is the same as in FIG. 10, except that there is less restriction to the fluid flow from fluid motor port 316 because the opening defined by tapered groove 324 and the adjacent edge of groove 302 is larger in area due to further rightward movement of spool 320. Thus it will be seen that the cooperation of tapered groove 324 and the adjacent edge of groove 302 provides a variable orifice. Similarly, the cooperation of groove 322 with the adjacent edge of groove 294 provides a variable orifice.

Turning now to the operation of the third embodiment of my invention as shown in FIGS. 7 through 11, it will be assumed that power steering assembly 280 is associated with a vehicle having dirigible wheels and that movement of ball stud 72 to the right as seen in FIG. 7 causes the steering angle of the dirigible wheels to change so that the vehicle makes a right turn when travelling forwardly. Assuming now that valve spool 320 is initially in the neutral position shown in FIGS. 7 and 8, the vehicle will travel in a straight line and pressure fluid will flow from the pump through steering control valve 282 and return to the sump with substantially unrestricted flow. Further, fluid pressure will be maintained on each side of piston 20 so that should the dirigible wheels hit any normal obstruction the vehicle will not deviate from a straight line path.

Now, if ball stud 72 is actuated to the right so that the valve spool 320 is moved from the position shown in FIGS. 7 and 8 to the position shown in FIG. 9, the steering angle of the dirigible wheels will be changed so that the vehicle will execute a right turn. Because movement of valve spool 320 to the right directs pressure fluid to the head end of cylinder 18 the valve body 290 is caused to move to the right so that the relationship of valve spool 320 and valve body 290 is returned to the neutral position shown in FIGS. 7 and 8. This last-described action is generally termed follow-up and results in a power steering system which is dependent upon continued movement of the spool for continued change of steering angle of the dirigible wheels. Steeering speed is dependent upon the extent of displacement of valve spool 320 relative to valve body 290, the fastest steering speed being obtained when the valve spool 320 is fully displaced, as shown in FIG. 11.

From the above description it will be seen that certain fluid flows in the valve can be controlled in addition to and independently of the restraint on fluid flowing from the fluid motor ports. That is, the open center fluid flow can be controlled by varying the taper on edge 330 and 332, the open center return flow shut-off can be varied by changing the location of edges 330 and 332 so that communication between grooves 326 and 296 and grooves 328 and 300, respectively, can be shut off at different times, and fluid flow into the fluid motor ports 312 and 316 can be varied depending upon the taper and location of edges 334 and 336, respectively, e.g., from full fluid communication in the neutral position to no fluid communication in the neutral position.

It will now be apparent that during steering the piston 20 is held on one side by a force resulting from the pump pressure acting against piston 20 and is held on the other side by a force resulting from the return flow back pressure acting against the area of piston 20. This return flow back pressure depends on the taper of grooves 322 and 324, and also on the relative position of these grooves to the adjacent edge of grooves 296 and 302 respectively. This return flow back pressure must be set high enough so that valve body 290 is prevented from moving past the neutral position of FIGS. 7 and 8 in the situation where energy is stored in the power steering system prior to the system breaking loose and steering the dirigible wheels, in order to prevent oscillation or chatter, as explained earlier. In order to stabilize any particular system it is necessary to use a valve spool having a taper on grooves 322 and 324 that will result in a return flow back pressure in the cylinder that is great enough to decelerate the mass of the dirigible wheels and steering linkage. Since various steering systems will require different back pressures because of varying cylinder diameters, etc. no single valve spool can stabilize all systems.

Consequently, the third embodiment of my invention (FIGS. 7 through 11) has the disadvantage that different valve spools having different tapers on grooves 322 and 324 must be used in order to stabilize different power steering systems. In this regard the fourth embodiment of my invention (FIGS. 12 through 14) is superior to the third embodiment (FIGS. 7 through 11) since a single spool can be used to stabilize any given power steering system; however, the restraint on the fluid flowing from the fluid motor ports in the fourth embodiment of my invention is gained through a fixed orifice rather than a variable orifice as in the third embodiment of my invention. In some cases the fixed orifice may interfere with vehicle steering speed to an undesirable extent, as explained earlier, and so has this disadvantage.

Figure 12:
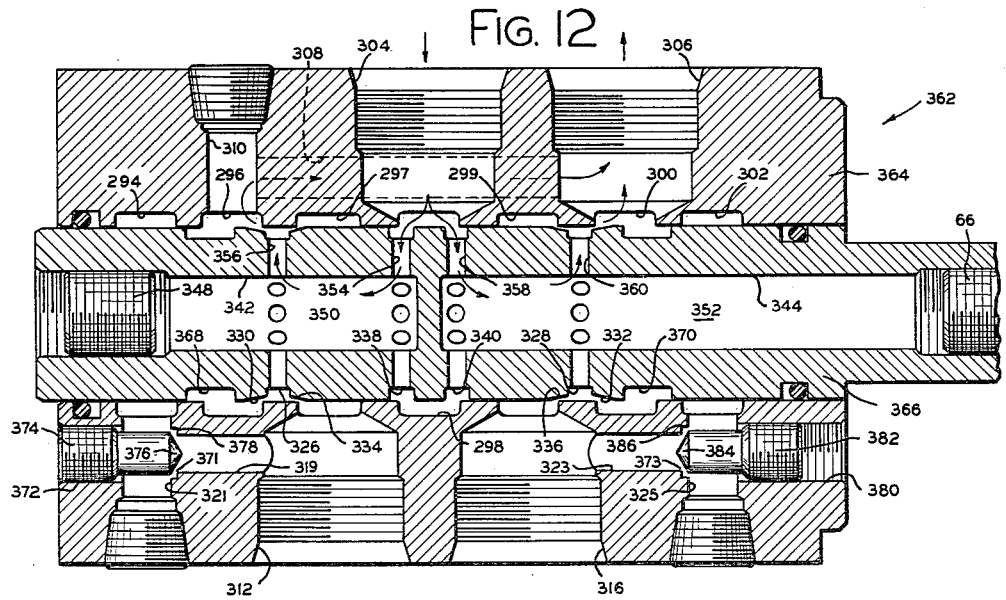
FIGURE 12 is similar to FIG. 8, except that a fourth embodiment of the control valve is shown.
Figure 13:
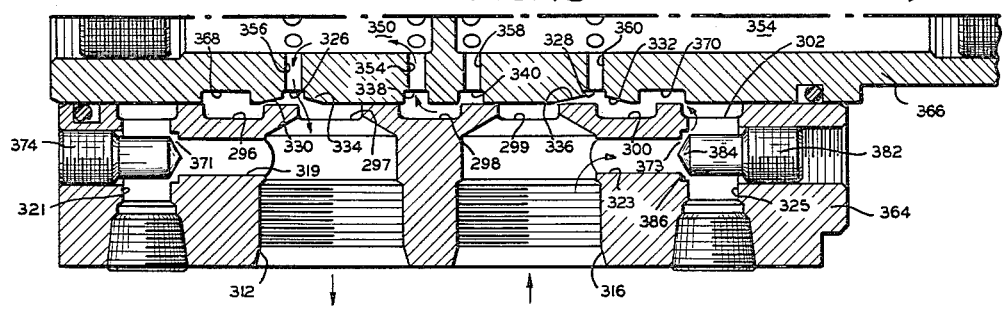
FIGURES 13 and 14 are similar to FIG. 12, except that only the portion of the control valve below the center line is shown and the valve spool has been shifted from the neutral position to a partially open position and a fully open position, respectively.
Figure 14:
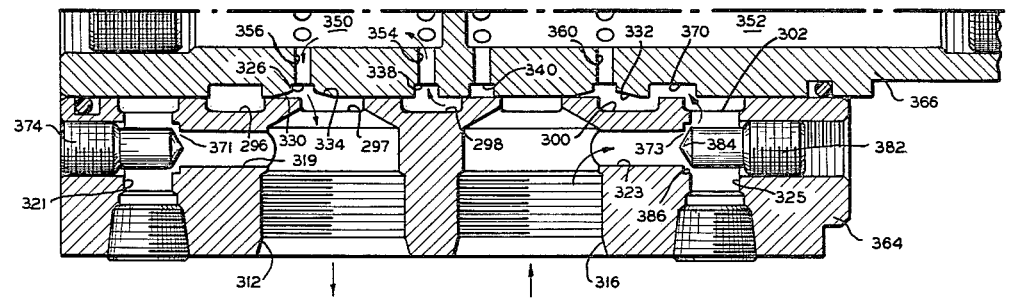

FIGURES 12, 13 and 14 show a control valve 362 as a fourth embodiment of my invention. Valve 362 includes a valve body 364 and a valve spool 366. For the most part valve body 364 and valve spool 366 are identical to the body and spool of valve 282 shown in FIGS. 7 through 11, and to this extent like reference numerals are used to designate like parts. The valve spool 366 differs from valve spool 320 in that annular tapered grooves 322 and 324 of spool 320 are replaced in spool 366 by a pair of annular grooves 368 and 370 which are not tapered. Valve body 364 differs from valve body 290 in that it includes a pair of adjustable fixed orifices 371 and 373.

Orifice 371 includes an adjustment screw 374 disposed in a threaded hole 372. Screw 374 has a cone point 376 which cooperates with a counterbored portion 378 of connecting passage 319 to form orifice 371. Likewise, an adjustment screw 382 is disposed in a threaded hole 380 and has a cone point 384 which cooperates with a counterbored portion 386 of passage 323 to form therewith orifice 373.

FIGURE 12 shows valve 362 in the neutral position. In neutral, the fluid flow is identical to the fluid flow described hereinabove with regard to FIGS. 7 and 8.

Referring now principally to FIG. 13 wherein valve spool 366 is shown displaced slightly to the right so that groove 370 begins to communicate with groove 302, the fluid flow to and from cylinder 18 is from a pump to inlet port 304 (FIG. 12) which connects with groove 298 and hence to chamber 350 via passages 354. From chamber 350 the fluid flow is outwardly through passages 356 and to groove 326, and then past tapered edge 334 into fluid motor port 312. From fluid motor ports 312 the fluid flows through a conduit 314 to a cylinder port 284 (FIG. 7) and hence into the head end of cylinder 18 via passage 288. At the same time, fluid is being forced out of the piston rod end of cylinder 18 through cylinder port 286 (FIG. 7) and conduit 318 into fluid motor port 316. From fluid motor port 316 the fluid flow is through passage 323, past orifice 373 defined by cone point 384 and counterbored portion 386 and into passage 325. From passage 325 the fluid flows into groove 302 and from there to groove 370 and groove 300 which connects with outlet port 306 (FIG. 12) and hence the reservoir. I have just described the principal fluid flow. In addition, there is some fluid flow past tapered edge 330 into groove 296 and from there to the sump as well as a slight fluid flow from groove 298 to groove 340 and hence to the sump. These secondary fluid flows aid in preventing shock loads in the valve that otherwise would occur if fluid flow between the various passages and ports was shut off abruptly. When valve spool 366 is in the position shown in FIG. 13, piston 20 is subjected to substantially full pump pressure on the right side thereof. The other side of piston 20 is subjected to the fluid back pressure caused by the fluid flowing out of cylinder 18 having to flow through the fixed orifice 373 defined by cone point 384 and counterbored portion 386.

Further displacement of valve spool 366 to the right, as shown in FIG. 14, results in completely closing off communication between tapered edge 330 and annular groove 296 and groove 298 and groove 340, so that the entire fluid flow from groove 298 is into fluid motor port 312 and hence into the head end of cylinder 18. The fluid flow from cylinder 18 is the same as described immediately hereinabove with regard to FIG. 13, except that the back pressure caused by orifice 373 through which the fluid must flow is increased due to the increased flow of fluid therethrough.

The operation of the fourth embodiment of my invention (FIGS. 12 through 14) is identical to the operation of the third embodiment of my invention (FIGS. 7 through 11), and therefore further description in this regard is felt to be unnecessary.

As stated earlier, the fourth embodiment of my invention (FIGS. 12 through 14) is subject to the same problem that the first embodiment (FIGS. 1 through 4) is subjected. That is, in some situations the adjustment of screws 372 and 382 to prevent oscillation or chatter may result in a steering speed that is undesirably slow. Consequently, I provide a fifth embodiment of my invention (FIGS. 15 through 17) wherein restriction of the fluid flow from cylinder 18 is accomplished by poppet valves which provides a constant back pressure, variable flow restriction means with the result that a power steering system may be stabilized using the embodiment shown in FIGS. 15 and 17 without interfering with steering speed of the power steering system. Further different steering systems may be stabilized with the fifth embodiment of my invention without changing spools, as is necessary with the third embodiment (FIGS. 7–11) of my invention.

Referring now to FIGS. 15 through 17, a valve 387 is shown as a fifth embodiment of my invention. Valve 387 includes a valve spool which is identical to valve spool 366 shown in FIGS. 12 through 14, so the same reference numerals are applied thereto. Also, the valve bodies are substantially identical, differing only in that the means for restraining fluid flow from the cylinder 18 are of a different type. Consequently, the same reference numerals are also applied to valve body 388, insofar as possible.

Disposed in valve body 388 is a pair of poppet valves 389 and 406. Poppet valve 389 includes a retaining and adjustment screw 392 disposed in a threaded hole 390 and which has a blind hole 394 opening toward passage 321. Disposed between screw 392 and a counterbored portion 395 of passage 319 is a valve member 396. Valve member 396 includes a rod portion 398 which has one end slidably disposed within hole 394 and a head portion 400 having a conical point 402 which engages the edge defined by passage 319 and counterbored portion 395. The valve member 396 is constantly biased into sealing relation with the above-mentioned edge by means of a helical spring 404 carried by rod portion 398 and compressed between screw 392 and head portion 400. Poppet valve 406 includes a retaining and adjustment screw 408 disposed in a threaded hole 410. The screw 408 has a blind hole 412 opening toward passage 325. Disposed between screw 408 and a counterbored portion 414 of passage 323 is a valve member 416. Valve member 416 includes a rod portion 418 having one end thereof disposed in hole 412 and a head portion 420 which has a conical point 422 that engages the edge defined by passage 323 and counterbored portion 414. The valve member 416 is constantly biased into sealing relation with the above-mentioned edge by means of a helical spring 424 carried by rod portion 418 and compressed between screw 408 and head portion 420.

It will be clear at this point that the back pressure caused by the poppet valves is directly proportional to the force exerted by the helical springs, and consequently can be varied by adjusting screws 392 and 408 inwardly or outwardly, as necessary, to stabilize any given power steering system.

The fluid flow of valve 387 (FIGS. 15 through 17) is the same as valve 362 (FIGS. 12 through 14) for the neutral position of valve 387 (FIG. 15). Also, the fluid flow between inlet port 304 and either fluid motor port in the displaced positions of the valve spool is the same for both valves. The fluid flow of valve 387 differs from the fluid flow of valve 362 when the valve spool is displaced from the neutral position only in that the fluid flow from either of the fluid motor ports must overcome the force of the helical spring holding the respective valve member in place in order to flow out of the fluid motor port. The result is that valve 387 provides a constant pressure, variable flow of fluid from the fluid motor ports.

The operation of valve 387 is identical with that of valve 282 (FIGS. 7–11), and so reference is made thereto for a description of the valve operation.

While I have shown and described five embodiments of my invention in conjunction with a power steering system, it will be understood that numerous modifications, changes and substitutions could be made thereto by a person skilled in the art without departing therefrom. For example, the hook-up of the steering control valve may be reversed, i.e., the valve spool may be connected to the steering linkage and the valve body may be operatively connected to the operator's steering wheel. In addition, the fluid actuator may be located remotely from the steering control valve rather than as a part of a unitary assembly with the valve. Further, my invention can be and has been used with servo systems other than power steering systems. For this reason the detailed description and drawing are intended to be illustrative only. The scope of my invention should be determined from the appended claims taken in conjunction with the prior art.

I claim:

1. A valve comprising an elongated body portion having a longitudinally extending bore, a fluid inlet port, a fluid outlet port, and a pair of longitudinally spaced apart fluid motor ports, said ports communicating with said bore, said outlet port having two openings in communication with said bore, a spool slidably disposed in said bore, first and second passage means in said spool, first and second restrictions to fluid flow disposed respectively in said passage means, said passage means and restrictions cooperating with said ports to provide a substantially unrestricted fluid flow between said fluid inlet and outlet ports and restricted fluid communication with said fluid motor ports in a first spool position, a substantially unrestricted fluid flow to one of said fluid motor ports and restricted fluid flow from the other of said fluid motor ports in a second spool position, and a substantially unrestricted fluid flow to said other fluid motor port and restricted fluid flow from said one fluid motor port in a third spool position.

2. A valve comprising an elongated body portion having a longitudinally extending bore, a fluid inlet port, a fluid outlet port, and a pair of longitudinally spaced apart fluid motor ports, said ports communicating with said bore, said outlet port having two openings in communication with said bore, a check valve disposed in said body and connecting said fluid inlet and outlet ports for fluid flow only from said outlet port to said inlet port, a spool slidably disposed in said bore, first and second passage means in said spool, first and second orifice means disposed respectively in said passage means, said passage means and orifice means cooperating with said ports to provide a substantially unrestricted fluid flow between said fluid inlet and outlet ports and restricted fluid communication with said fluid motor ports in the first spool position, a substantially unrestricted fluid flow to one of said fluid motor ports and restricted fluid flow from the other of said fluid motor ports in a second spool position, and a substantially unrestricted fluid flow to said other fluid motor port and restricted fluid flow from said one motor port in a third spool position.

3. A valve comprising an elongated body portion having a longitudinally extending bore, a fluid inlet port, a fluid outlet port, and a pair of longitudinally spaced apart fluid motor ports, said ports communicating with said bore, said outlet port having two openings in communication with said bore, a spool slidably disposed in said bore, first and second passage means in said spool, first and second orifice means disposed respectively in said passage means, said passage means and orifice means cooperating with said ports to provide a substantially unrestricted fluid flow between said fluid inlet and outlet ports in a first spool position, restricted fluid flow to and from said fluid motor ports during a portion of the movement of said spool away from said first spool position, and a substantially unrestricted fluid flow to one of said fluid motor ports and restricted fluid flow from the other of said fluid motor ports during the remainder of travel of said spool.

4. A valve comprising a body having a longitudinally extending bore, a fluid inlet port, a fluid outlet port, and a pair of longitudinally spaced apart fluid motor ports, said ports communicating with said bore, said outlet port having two openings in communication with said bore, a spool slidably disposed in said bore, a pair of separate passage means in said spool, a pair of fixed orifices disposed respectively in said passage means, said passage means and orifices cooperating with said ports to provide a substantially unrestricted fluid flow between said fluid inlet and outlet ports in a first spool position, restricted fluid flow to and from said fluid motor ports during a portion of spool movement in either direction from said first spool position, a substantially unrestricted fluid flow to one of said fluid motor ports and restricted fluid flow from the other of said fluid motor ports for the remainder of spool movement in one direction, and a substantially unrestricted fluid flow to said other fluid motor port and restricted fluid flow from said one fluid motor port for the remainder of spool movement in the other direction.

5. A valve comprising a body having a longitudinally extending bore, a fluid inlet port, a fluid outlet port, and a pair of longitudinally spaced apart fluid motor ports, said ports communicating with said bore, said outlet port having two openings in communication with said bore, a spool slidably disposed in said bore, first and second passage means in said spool, a pair of fixed orifice means disposed respectively in said passage means, said passage means and orifice means cooperating with said ports to provide a substantially unrestricted fluid flow between said fluid inlet and outlet ports in a first spool position, a substantially unrestricted fluid flow to one of said fluid motor ports and restricted fluid flow from the other of said fluid motor ports in a second spool position, and a substantially unrestricted fluid flow to said other fluid motor port and restricted fluid flow from said one fluid motor port in a third spool position.

6. A valve comprising a body having a longitudinally extending bore, a spool slidably disposed in said bore, first, second and third longitudinally spaced apart annular grooves in the wall of said bore, an inlet port disposed in said body and communicating with said second groove, an outlet port disposed in said body and communicating with said third groove, a passage in said body connecting said first groove and said outlet port, a pair of motor ports in the wall of said bore disposed respectively between said first and second grooves and said third and second grooves, a first pair of longitudinally spaced apart annular grooves in the surface of said spool disposed to communicate respectively with said first and third grooves, a second pair of longitudinally spaced apart annular grooves in the surface of said spool disposed between said first pair of grooves to communicate respectively with said pair of motor ports, a third pair of longitudinally spaced apart annular grooves in the surface of said spool disposed between said second pair of grooves to communicate with said second groove, a first pair of separate passage means in said spool connecting respectively said first pair of grooves with said third pair of grooves, a second pair of separate passage means connecting respectively said first pair of passage means and said second pair of grooves, and orifice means disposed respectively between said first and second pairs of passage means.

7. A valve comprising a body having a longitudinally extending bore, a spool slidably disposed in said bore, first, second and third longitudinally spaced apart annular grooves in the wall of said bore, said second groove being disposed between said first and third grooves, an inlet port disposed in said body and communicating with said second groove, an outlet port disposed in said body and communicating with said third groove, a safety check valve connecting said second and third grooves and permitting fluid flow only from said third groove to said second groove, a passage in said body connecting said first groove and said outlet port, a pair of fluid motor ports in the wall of said bore disposed respectively between said first and second grooves and said third and second grooves, a first pair of longitudinally spaced apart annular tapered grooves in the surface of said spool disposed to communicate respectively with said first and third grooves, a second pair of longitudinally spaced apart annular grooves in the surface of said spool disposed between said first pair of grooves to communicate respectively with said pair of fluid motor ports, a third pair of longitudinally spaced apart annular grooves in the surface of said spool disposed between said second pair of grooves to communicate with said second groove, a first pair of separate passage means in said spool connecting respectively said first pair of grooves with said third pair of grooves, a second pair of separate passage means connecting respectively said first pair of passage means and said second pair of grooves, and orifice means disposed respectively between said first and second pairs of passage means.

8. A valve comprising a body having a longitudinally extending bore, a fluid inlet port, a fluid outlet port and a pair of longitudinally spaced apart fluid motor ports, said ports communicating with said bore, said outlet port having two openings in communication with said bore, a spool slidably disposed in said bore, a pair of separate passage means in said spool, a pair of screws threadably engaging said spool and cooperating respectively with said pair of passage means to form therewith adjustable fixed orifices, said passages and orifices cooperating with said ports to provide a substantially unrestricted fluid flow between said fluid inlet and outlet ports in a first spool position, a substantially unrestricted fluid flow to one of said fluid motor ports and restricted fluid flow from the other of said fluid motor ports in a second spool position, and a substantially unrestricted fluid flow to said other fluid motor port and restricted fluid flow from said one fluid motor port in a third spool position.

9. A valve comprising a body having a longitudinally extending bore, a fluid inlet port, a fluid outlet port, and a pair of longitudinally spaced apart fluid motor ports, said ports communicating with said bore, said outlet port having two openings in communication with said bore, a spool slidably disposed in said bore, a pair of separate passage means in said spool, a pair of screws threadably disposed in said spool and cooperating respectively with said passage means to form therewith adjustable fixed orifices, said passage means and orifices cooperating with said ports to provide a substantially unrestricted fluid flow between said inlet and outlet ports in a first position, restricted fluid flow to and from the said fluid motor ports during a portion of the spool movement away from said first spool position in either direction, a substantially unrestricted fluid flow to one of said fluid motor ports and restricted fluid flow from the other of said fluid motor ports during the remainder of spool movement away from said first spool position in one direction, and a substantially unrestricted fluid flow to said other fluid motor port and restricted fluid flow from said one fluid motor port during the remainder of spool movement away from said first spool position in the other direction.

10. A valve comprising a body having a longitudinally extending bore, a spool slidably disposed in said bore, first, second and third longitudinally spaced apart annular grooves in the wall of said bore, said second groove being disposed between said first and third grooves, an inlet port disposed in said body and communicating with said second groove, an outlet port disposed in said body and communicating with said third groove, a passage in said body connecting said first groove and said outlet port, a pair of fluid motor ports in the wall of said bore disposed respectively between said first and second grooves and said third and second grooves, a first pair of longitudinally spaced apart annular grooves in the surface of said spool disposed to communicate respectively with said first and third grooves, a second pair of longitudinally spaced apart annular grooves in the surface of said spool disposed between said first pair of grooves to communicate respectively with said pair of fluid motor ports, a third pair of longitudinally spaced apart annular grooves in the surface of said spool disposed between said second pair of grooves to communicate with said second groove, a first pair of separate passage means in said spool connecting respectively said first pair of grooves with said third pair of grooves, a second pair of separate passage means connecting respectively said first pair of passage means and said second pair of grooves, and a pair of screws threadably disposed in said spool and cooperating respectively with said second pair of passage means to form adjustable fixed orifices, said orifices permitting fluid flow in either direction therethrough.

11. A valve comprising a body having a longitudinally extending bore, a fluid inlet port, a fluid outlet port and a pair of longitudinally spaced apart fluid motor ports, said ports communicating with said bore, said outlet port having two openings in communication with said bore, a spool slidably disposed in said bore, a first pair of passage means disposed in said bore, a pair of fixed orifice means disposed respectively in said passage means, a second pair of passage means connected respectively with said first pair of passage means and by-passing respectively said orifice means, a pair of constant pressure, variable flow restriction means disposed respectively in said second pair of passage means, said passage means, orifice means and restriction means cooperating with said ports to provide a substantially unrestricted fluid flow between said fluid inlet and outlet ports and fluid communication with said fluid motor ports in a first spool position, a substantially unrestricted fluid flow to one of said fluid motor ports and restricted fluid flow from the other of said fluid motor ports in a second spool position, and a substantially unrestricted fluid flow to said other fluid motor port and restricted fluid flow from said one fluid motor port in a third spool position.

12. A valve comprising a body having a longitudinally extending bore, a fluid inlet port, a fluid outlet port, and a pair of longitudinally spaced apart fluid motor ports, said ports communicating with said bore, said outlet port having two openings in communication with said bore, a spool slidably disposed in said bore, a pair of passage means in said spool, a pair of fixed orifice means disposed respectively in said passage means, a pair of constant pressure, variable flow restriction means disposed respectively in said passage means in parallel with said fixed orifice means, said passage means, orifice means and restriction means cooperating with said ports to provide a substantially unrestricted fluid flow between said fluid inlet and outlet ports and fluid communication with said fluid motor ports in a first spool position, restricted fluid flow to and from said motor ports during a portion of the spool movement away from said first spool position, and a substantially unrestricted fluid flow to one of said fluid motor ports and restricted fluid flow at a substantially constant pressure and variable volume from the other of said fluid motor ports during the remainder of said spool movement.

13. A valve comprising a body having a longitudinal axis, a longitudinally extending bore, a spool slidably disposed in said bore, first, second and third longitudinally spaced apart annular grooves in the wall of said bore, said second groove being disposed between said first and third grooves, an inlet port disposed in said body and communicating with said second groove, an outlet port disposed in said body and communicating with said third groove, a passage in said body connecting said first groove and said outlet port, a pair of fluid motor ports in the wall of said bore disposed respectively between said first and second grooves and said third and second groves, a first pair of longitudinally spaced apart annular grooves in the surface of said spool disposed to communicate respectively with said first and third grooves, a second pair of longitudinally spaced apart annular grooves in the surface of said spool disposed between said first pair of grooves to communicate respectively with said pair of fluid motor ports, a third pair of longitudinally spaced apart annular grooves in the surface of said spool disposed between said second pair of grooves to communicate with said second groove, a first pair of separate passage means in said spool connecting respectively said first pair of grooves with said third pair of grooves, a second pair of separate passage means communicating with said second pair of grooves, a pair of fixed orifice means connecting said first and second pairs of passage means, said pair of fixed orifice means permitting fluid flow in either direction therethrough, and a pair of one-way valve means in parallel with said pair of fixed orifice means and connecting said first and second pairs of passage means, said pair of one-way valve means permitting fluid flow from said second pair of passage means to said first pair of passage means at a predetermined fluid pressure.

14. A valve comprising a body having a longitudinal axis, a longitudinally extending bore, a spool slidably disposed in said bore, first, second and third longitudinally spaced apart annular grooves in the wall of said bore, said second groove being disposed between said first and third grooves, an inlet port disposed in said body and communicating with said second groove, an outlet port disposed in said body and communicating with said third groove, a passage in said body connecting said first groove and said outlet port, a pair of fluid motor ports in the wall of said bore disposed respectively between said first and second grooves and said third and second grooves, a first pair of longitudinally spaced apart annular grooves in the surface of said spool disposed to communicate respectively with said first and third grooves, a second pair of longitudinally spaced apart annular grooves in the surface of said spool disposed between said first pair of grooves to communciate respectively with said pair of fluid motor ports, a third pair of longitudinally spaced part annular grooves in the surface of said spool disposed between said second pair of grooves to communicate with said second groove, a first pair of separate passage means in said spool connecting respectively said first pair of grooves with said third pair of grooves, a second pair of separate passage means communicating with said second pair of grooves, a pair of fixed orifice means connecting said first and second pairs of passage means, said pair of fixed orifice means permitting fluid flow in either direction therethrough, and a pair of one-way valve means in parallel with said pair of fixed orifice means and connecting said first and second pairs of passage means, said pair of one-way valve means permitting fluid flow from said second pair of passage means to said first pair of passage means at a predetermined fluid pressure, each one-way valve means including a bore disposed in said spool and having a reduced diameter portion communicating with one of said second passage means, said bore in said spool and said reduced diameter portion connecting one of said first pair of passage means with one of said second pair of passage means, a valve member disposed in said bore in said spool and spring means for yieldably biasing said valve member into fluid sealing relation with said reduced diameter portion.

15. A valve comprising an elongated body having a longitudinally extending bore, first, second, third, fourth, fifth, sixth and seventh annular, longitudinally spaced apart grooves in the wall of said bore, a fluid inlet port connected to said fourth groove, a fluid outlet port connected to said sixth groove, a first fluid passage connecting said second groove and said fluid outlet port, first and second fluid motor ports connecting respectively with said third and fifth grooves, second and third fluid passages connecting respectively said first fluid motor port with said first groove and said second fluid motor port with said seventh groove, a spool slidably disposed in said bore, said spool including eighth, ninth, tenth, eleventh, twelfth and thirteenth annular, longitudinally spaced apart grooves in the surface thereof, first and second chambers located in said spool, first and second radially extending passages connecting respectively said tenth groove with said first chamber and said eleventh groove with said second chamber, third and fourth radially extending passages connecting respectively said first chamber with said ninth groove and said second chamber with said twelfth groove, said tenth and eleventh grooves communicating with said fourth groove in a neutral spool position, said ninth groove communicating with said second and third grooves in a neutral spool position, said twelfth groove communicating with said fifth and sixth grooves in a neutral spool position, said eighth groove being operable to connect said first and second grooves in a shifted spool position, said thirteenth groove being operable to connect said sixth and seventh grooves in a shifted spool position, and means for restricting fluid flow from said first fluid motor port to said second groove when said spool is shifted in one direction and restricting fluid flow from said second fluid motor port to said sixth groove when said valve is shifted in the other direction.

16. A valve comprising an elongated body having a longitudinally extending bore, a centrally located fluid inlet port, a pair of fluid outlet ports located adjacent the ends of said bore, a pair of fluid motor ports located respectively between said fluid inlet port and said fluid outlet ports, said ports communicating with said bore, a spool slidably disposed in said bore, a first pair of fluid passage means located in said spool connecting said fluid inlet port with said fluid outlet ports in a neutral spool position, one of said first pair of fluid passage means connecting said fluid inlet port with one of said fluid motor ports when said spool is in said neutral position and when it is shifted in one direction, the other of said first pair of fluid passage means connecting said fluid inlet port with the other said fluid motor ports when said spool is in said neutral position and when it is shifted in the other direction, and a second pair of fluid passage means, one of said second pair of fluid passage means connecting one of said fluid motor ports with one of said fluid outlet ports when said spool is shifted in the said other direction, the other of said second fluid passage means connecting the other of said motor ports with the other of said fluid outlet ports when said spool is shifted in the said first direction, and means for restricting fluid flow from said fluid motor ports to said fluid outlet ports through said second pair of fluid passage means.

17. A valve comprising an elongated body having a longitudinally extending bore, a centrally located fluid inlet port, a pair of fluid outlet ports located adjacent the ends of said bore, a pair of fluid motor ports located respectively between said fluid inlet port and said fluid outlet ports, all said ports communicating with said bore, a spool slidably disposed in said bore, a first pair of fluid passage means located in said spool, one of said first pair of passage means connecting said fluid inlet port with one of said outlet ports and one of said fluid motor ports in a neutral spool position, the other of said first pair of fluid passage means connecting said fluid inlet port with the other of said fluid outlet ports and the other of said fluid motor ports in a neutral spool position, a second pair of fluid passage means, one of said second pair of fluid passage means connecting one of said fluid motor ports with one of said fluid outlet ports in a shifted spool position, the other of said second fluid passage means connecting the other of said fluid motor ports with the other of said fluid outlet ports in a shifted spool position, and means for controlling fluid flow from said fluid motor ports to said fluid outlet ports through said second pair of fluid passage means.

18. An elongated valve body having a longitudinally extending bore, first, second, third, fourth, fifth, sixth and seventh annular, longitudinally spaced apart grooves in the wall of said bore, a fluid inlet port connected to said fourth groove, a fluid outlet port connected to said sixth groove, a first fluid passage connecting said second groove and said fluid outlet port, first and second fluid motor ports connecting respectively with said third and fifth grooves, second and third fluid passages connecting respectively said first fluid motor port with said first groove and said second fluid motor port with said seventh groove, and means disposed respectively in said second and third fluid passages for restricting fluid flow from said fluid motor ports to said bore.

19. A valve comprising an elongated body having a longitudinally extending bore, a centrally located fluid inlet port, a pair of fluid outlet ports located adjacent the ends of said bore, a pair of fluid motor ports located respectively between said fluid inlet port and said fluid outlet ports, said ports communicating with said bore, a spool slidably disposed in said bore, a first pair of fluid passage means located in said spool, one of said first pair of fluid passage means connecting said fluid inlet port with one of said fluid outlet ports and one said fluid motor ports in a neutral spool position, the other of said first pair of fluid passage means connecting said fluid inlet port with the other of said fluid outlet ports and the other of said fluid motor ports in a neutral spool position, a second pair of fluid passage means located in said body additionally connecting said fluid motor ports with said bore, a third pair of fluid passage means located in the surface of said spool for connecting respectively said second pair of said passage means with said fluid outlet ports, and means disposed in said second pair of fluid passage means for controlling fluid flow from said fluid motor ports.

20. A valve as set forth in claim 19 wherein said controlling means include a pair of fixed orifices disposed respectively in said second pair of fluid passage means.

21. A valve as set forth in claim 19 wherein said controlling means include a pair of poppet valves disposed respectively in said second pair of fluid passage means.

22. A valve comprising an elongated body having a longitudinally extending bore, a centrally located fluid inlet port, a pair of fluid outlet ports located adjacent the ends of said bore, a pair of fluid motor ports located respectively between said inlet port and said fluid outlet ports, said ports communicating with said bore, a pair of annular grooves disposed in the wall of said bore and located respectively outwardly of said fluid outlet ports, a pair of fluid passages respectively connecting said fluid motor ports with said grooves, a spool slidably disposed in said bore, a pair of fluid passage means located in said spool, one of said pair of fluid passage means connecting said fluid inlet port with one of said fluid outlet ports and one of said fluid motor ports in a neutral spool position, the other of said pair of fluid passage means connecting said fluid inlet port with the other of said fluid outlet ports and the other of said fluid motor ports in a neutral spool position, and a pair of tapered annular grooves located in the surface of said spool, one of said tapered grooves cooperating with one of said grooves in said bore in a shifted spool position to form a variable orifice for restricting fluid flow from one of said fluid motor ports, the other of said tapered grooves cooperating with the other of said grooves in said bore in a shifted spool position to form a variable orifice for restricting fluid flow from the other of said fluid motor ports.

23. A valve comprising an elongated body having a longitudinally extending bore, a centrally located fluid inlet port, a pair of fluid outlet ports located adjacent the ends of said bore, a pair of fluid motor ports located respectively between said inlet port and said fluid outlet ports, said ports communicating with said bore, a spool slidably disposed in said bore, a first pair of fluid passage means located in said spool, one of said first pair of fluid passage means connecting said fluid inlet port with one of said fluid outlet ports and one said motor ports in a neutral spool position, the other of said first pair of fluid passage means connecting said fluid inlet port with the other of said fluid outlet ports and the other of said fluid motor ports in a neutral spool position, a second pair of fluid passage means located in said body, one of said second pair of fluid passage means connecting one of said fluid motor ports with said bore, the other of said second pair of fluid passage means connecting the other of said fluid motor ports with said bore, and a third pair of passage means located in the surface of said spool for connecting said second pair of passage means with said fluid outlet ports, said second and third pairs of fluid passage means respectively cooperating to form a pair of variable orifices which serve to restrict fluid flow from said fluid motor ports.

24. A valve comprising an elongated body having a longitudinally extending bore, first, second, third, fourth, fifth, sixth and seventh annular, longitudinally spaced apart grooves in the wall of said bore, a fluid inlet port connected to said fourth groove, a fluid outlet port connected to said sixth groove, a first fluid passage connecting said second groove and said fluid outlet port, first and second fluid motor ports connecting respectively with said third and fifth grooves, second and third fluid passages connecting respectively said first fluid motor port with said first groove and said second fluid motor port with said seventh groove, a spool slidably disposed in said bore, said spool including eighth, ninth, tenth, eleventh, twelfth, and thirteenth annular, longitudinally spaced apart grooves in the surface thereof, first and second chambers located in said spool, first and second pluralities of radially extending passages connecting respectively said tenth groove with said first chamber and said eleventh groove with said second chamber, and third and fourth pluralities of radially extending passages connecting respectively said first chamber with said ninth groove and said second chamber with said twelfth groove, said tenth and eleventh grooves communicating with said fourth groove in a neutral spool position, said ninth groove communicating with said second and third grooves in a neutral spool position, said twelfth groove communicating with said fifth and sixth grooves in a neutral spool position, said eighth groove being operable to connect said first and second grooves and cooperating with said first groove to form a variable orifice for restricting fluid flow from said first fluid motor port in a shifted spool position, said thirteenth groove being operable to connect said sixth and seventh grooves and cooperating with said seventh groove to form a variable orifice for restricting fluid flow from said second fluid motor port in a shifted spool position.

25. A valve comprising an elongated body having a longitudinally extending bore, a centrally located fluid inlet port, a pair of fluid outlet ports located adjacent the ends of said bore, a pair of fluid motor ports located respectively between said fluid inlet port and said fluid outlet ports, all said ports communicating with said bore, a spool slidably disposed in said bore, a first pair of fluid passage means in said spool, said first pair of fluid passage means connecting said fluid inlet port with said fluid outlet ports in a neutral spool position, one of said first pair of fluid passage means connecting said fluid inlet port with one of said fluid motor ports when said spool is in said neutral position and when it is shifted in one direction, the other of said first pair of fluid passage means connecting said fluid inlet port with the other of said fluid motor ports when said spool is in said neutral position and when it is shifted in the other direction, a second pair of fluid passage means located in said body additionally connecting said fluid motor ports respectively with said bore, a third pair of fluid passage means located in surface of said spool, one of said third pair of fluid passage means connecting one of said second pair of fluid passage means with the said one fluid outlet port when said spool is shifted in the said other direction, the other of said third pair of fluid passage means connecting the other of said second pair of fluid passage means with the said other fluid outlet port when said spool is shifted in the said one direction, and pair of screws threadably disposed in said body and cooperating respectively with said second passage means to form therewith a pair of adjustable fixed orifices for restricting fluid flow from said fluid motor ports.

26. A valve comprising an elongated body having a longitudinally extending bore, first, second, third, fourth, fifth, sixth and seventh annular, longitudinally spaced apart grooves in the wall of said bore, a fluid inlet port connected to said fourth groove, a fluid outlet port connected to said sixth groove, a first fluid passage connecting said second groove and said fluid outlet port, first and second fluid motor ports connecting respectively with said third and fifth grooves, second and third fluid passages connecting respectively said first fluid motor port with said first groove and said second fluid motor port with said seventh groove, a spool slidably disposed in said bore, said spool including eighth, ninth, tenth, eleventh, twelfth and thirteenth annular, longitudinally spaced apart grooves in the surface thereof, said tenth and eleventh grooves communicating with said fourth groove in a neutral spool position, said ninth groove having tapered edges for communicating simultaneously with said second and third groves in a neutral spool position, said twelfth groove having tapered edges for communicating simultaneously with said fifth and sixth grooves in a neutral spool position, said eighth and thirteenth grooves being operable to alternatively connect said first and second grooves and said sixth and seventh grooves in a shifted spool position, first and second chambers located in said spool, first and second radially extending passage means connecting respectively said tenth groove with said first chamber and said eleventh groove with said second chamber, third and fourth radially extending passage means connecting respectively said first chamber with said ninth groove and said second chamber with said twelfth groove, and first and second screws threadably disposed in said body, said first screw cooperating with said second fluid passage to form therewith an adjustable fixed orifice for restricting fluid flow from said first fluid motor port, said second screw cooperating with said third fluid passage to form therewith an adjustable fixed orifice for restricting fluid flow from said second fluid motor port.

27. A valve comprising an elongated body having a longitudinally extending bore, a centrally located fluid inlet port, a pair of fluid outlet ports located adjacent the ends of said bore, a pair of fluid motor ports located respectively between said fluid inlet port and said fluid outlet ports all said ports communicating with said bore, a spool slidably disposed in said bore, a first pair of fluid passage means located in said spool, said first pair of fluid passage means connecting said fluid inlet port with said fluid outlet ports in a neutral spool position, one of said first pair of fluid passage means connecting said fluid inlet port with one of said fluid motor ports when said spool is in said neutral position and when it is shifted in one direction, the other of said first pair of fluid passage means connecting said fluid inlet ports with the other of said fluid motor ports when said spool is in said neutral position and when it is shifted in the other direction, a second pair of fluid passage means located in said body additionally connecting said fluid motor ports with said bore, a third pair of fluid passage means located in surface of said spool, one of said third pair of fluid passage means connecting one of said second pair of fluid passage means with the said one fluid outlet port when said spool is shifted in the said other direction, the other of said third pair of fluid passage means connecting the other of said second pair of fluid passage means with the said other other fluid outlet port when said spool is shifted in the said one direction, and a pair of one-way valves disposed respectively in said second pair of fluid passage means for controlling fluid flow from said fluid motor ports.

28. A valve comprising an elongated body having a longitudinally extending bore, first, second, third, fourth, fifth, sixth and seventh annular, longitudinally spaced apart grooves in the wall of said bore, a fluid inlet port connected to said fourth groove, a fluid outlet port connected to said sixth groove, a first fluid passage connecting said second groove and said fluid outlet port, first and second fluid motor ports connecting respectively with said third and fifth grooves, second and third fluid passages connecting respectively said first motor port with said first groove and said second fluid motor port with said seventh groove, a spool slidably disposed in said bore, said spool including eighth, ninth, tenth, eleventh, twelfth and thirteenth annular, longitudinally spaced apart grooves in the surface thereof, said tenth and eleventh grooves communicating with said fourth groove in a neutral spool position, said ninth groove having tapered edges for communicating simultaneously with said second and third grooves in a neutral spool position, said twelfth groove having tapered edges for communicating simultaneously with said fifth and sixth grooves in a neutral spool position, said eighth and thirteenth grooves being operable to connect alternatively said first and second grooves and said sixth and seventh grooves when said spool is shifted from a neutral position, first and second chambers located in said spool, first and second passage means connecting respectively said tenth groove with said first chamber and said eleventh groove with said second chamber, third and fourth passage means connecting respectively said first chamber with said ninth groove and said second chamber with said twelfth groove, and first and second poppet valves disposed respectively in said second and third fluid passages, each said poppet valve including a valve member which cooperates with the respective fluid passage to restrict fluid flow therethrough and means tending to bias said valve member into fluid sealing relation with the said respective fluid passage.

References Cited in the file of this patent

UNITED STATES PATENTS

| | | |
|---|---|---|
| 2,648,313 | Clifton | Aug. 11, 1953 |
| 2,655,904 | Strayer et al. | Oct. 20, 1953 |
| 2,681,045 | Klessig et al. | June 15, 1954 |
| 2,788,770 | Folkerts | Apr. 16, 1957 |
| 2,858,802 | Parsons et al. | Nov. 4, 1958 |
| 2,876,796 | Pool et al. | Mar. 10, 1959 |
| 2,971,536 | Junck et al. | Feb. 14, 1961 |
| 3,016,049 | Smith et al. | Jan. 9, 1962 |
| 3,053,052 | Garrison et al. | Sept. 11, 1962 |